July 17, 1962
R. W. TRIPP ETAL
3,045,230
ANALOG-DIGITAL CONVERTER
Filed March 12, 1958
19 Sheets-Sheet 5
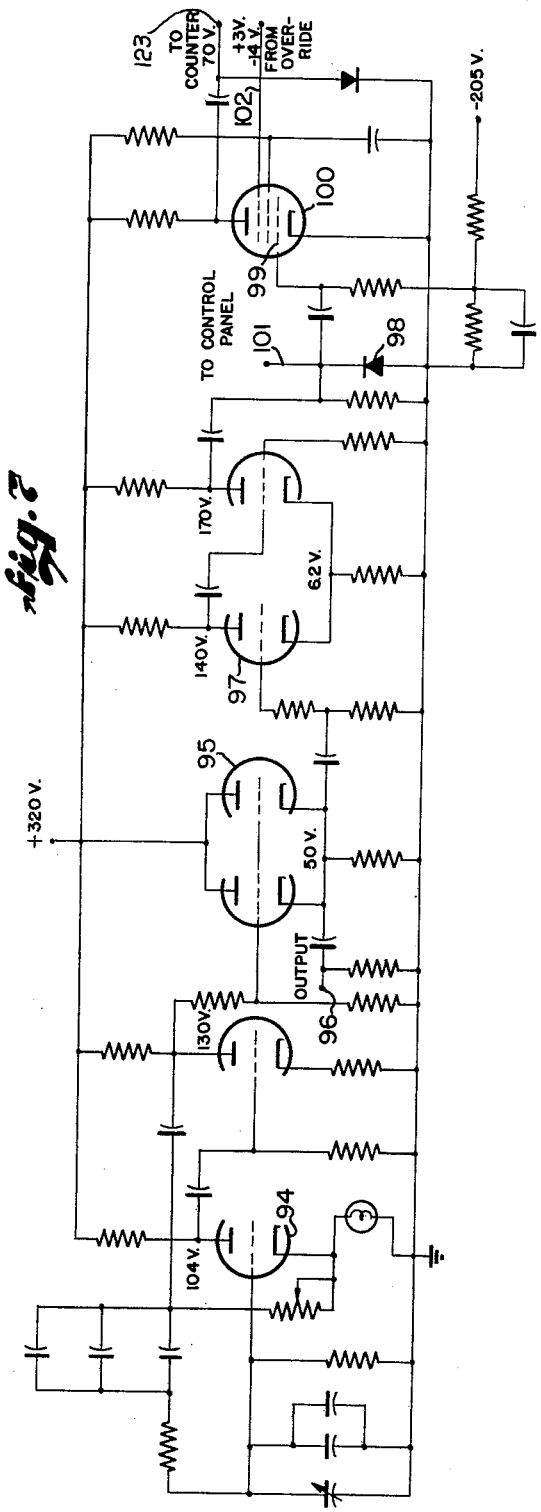
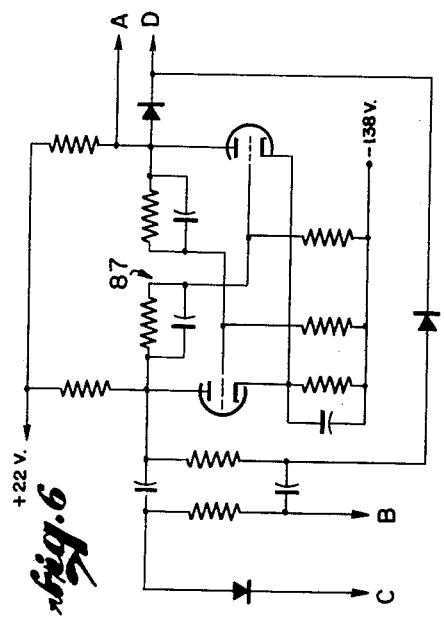
ROBERT W. TRIPP &
JAMES L. WINGET,
INVENTORS.
BY *W E Beatty*
ATTORNEY.

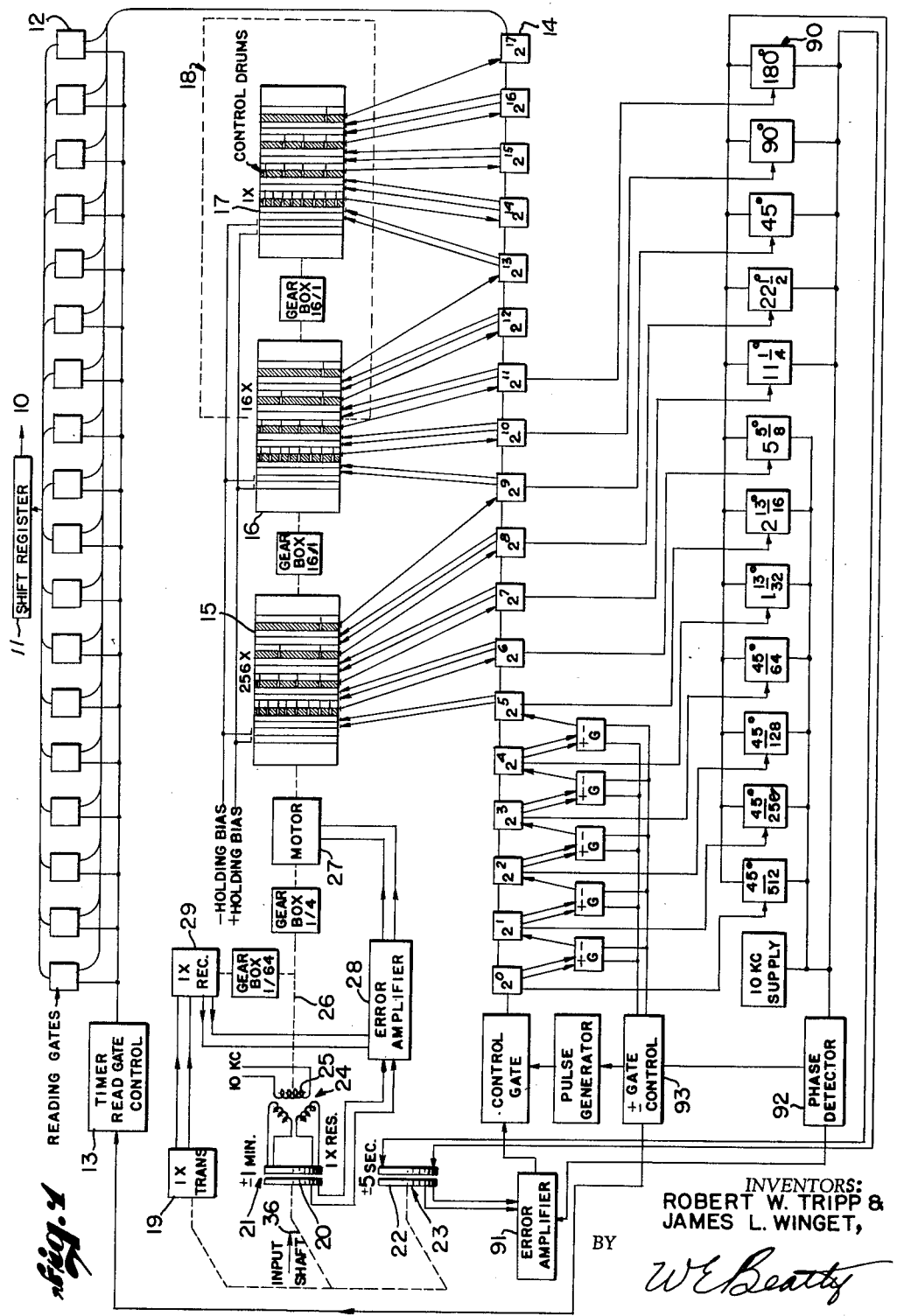

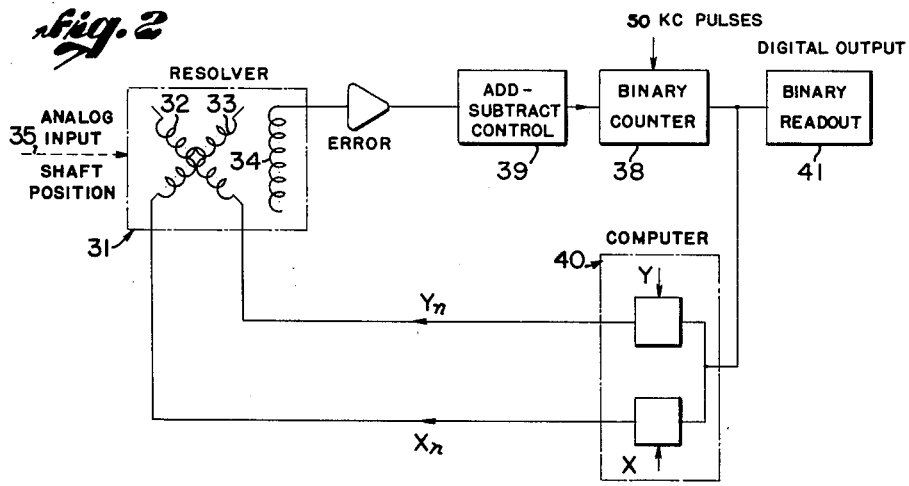
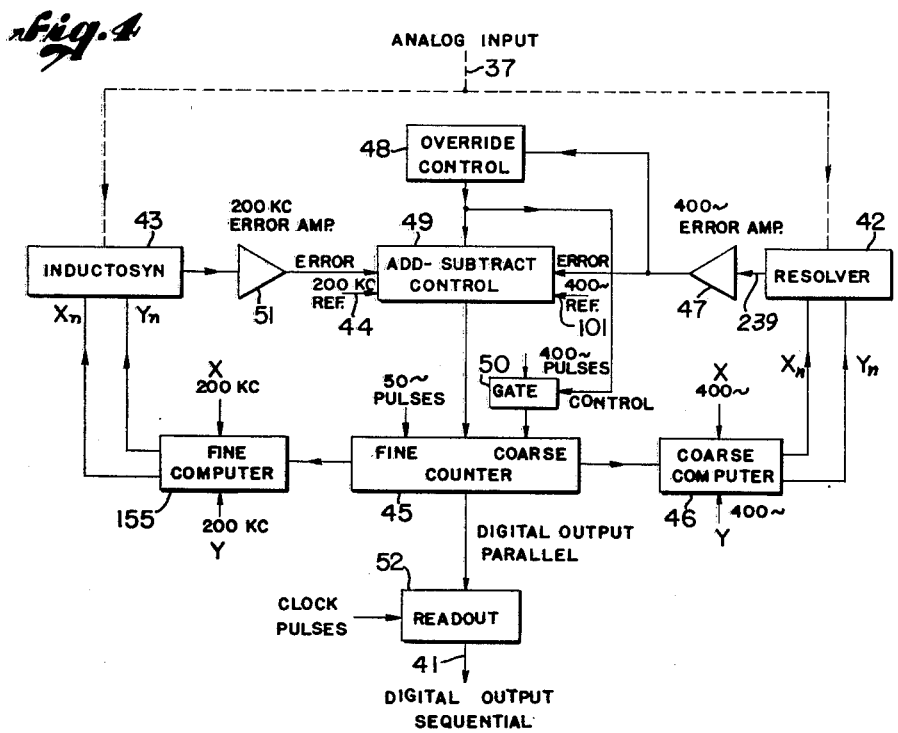

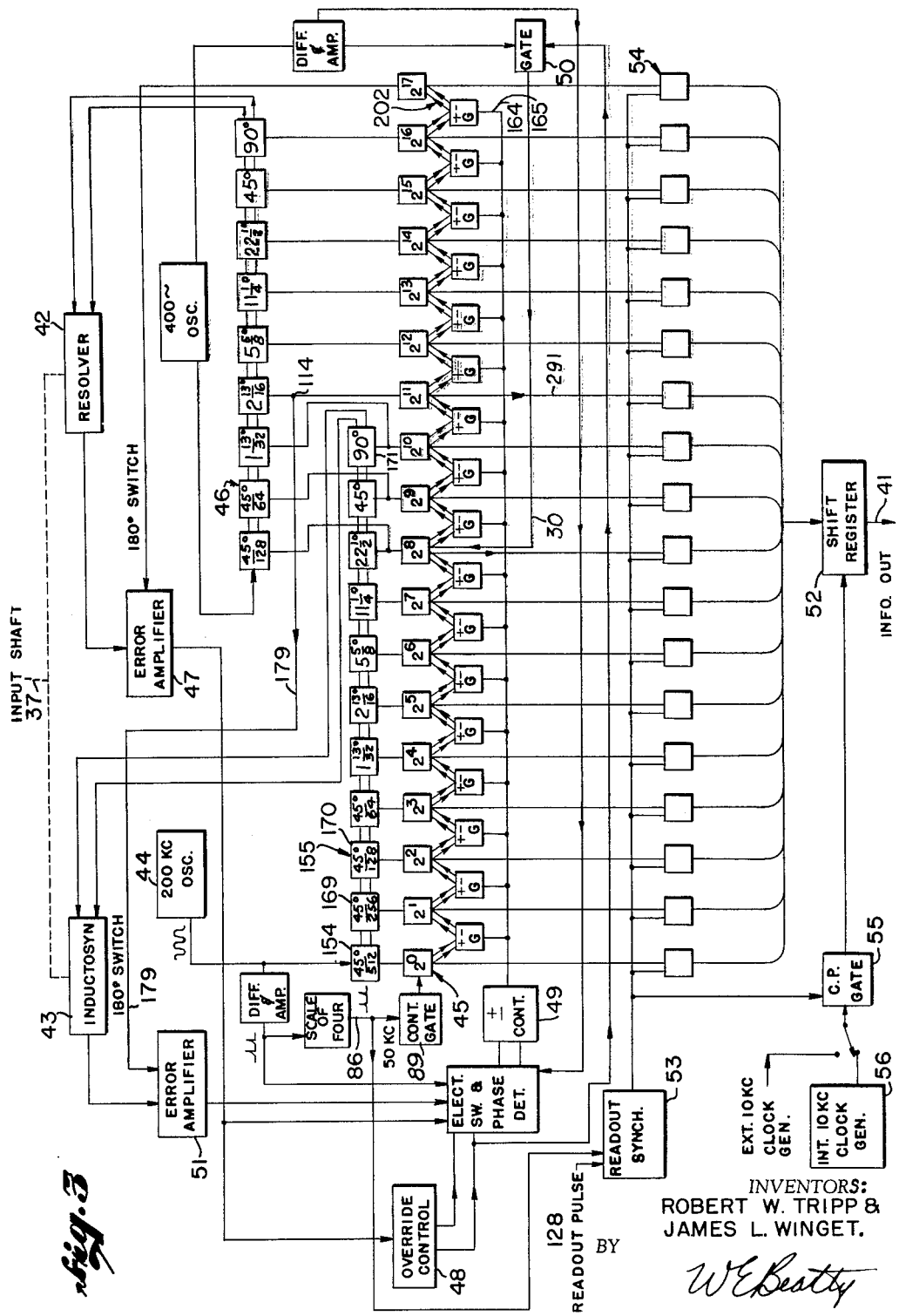

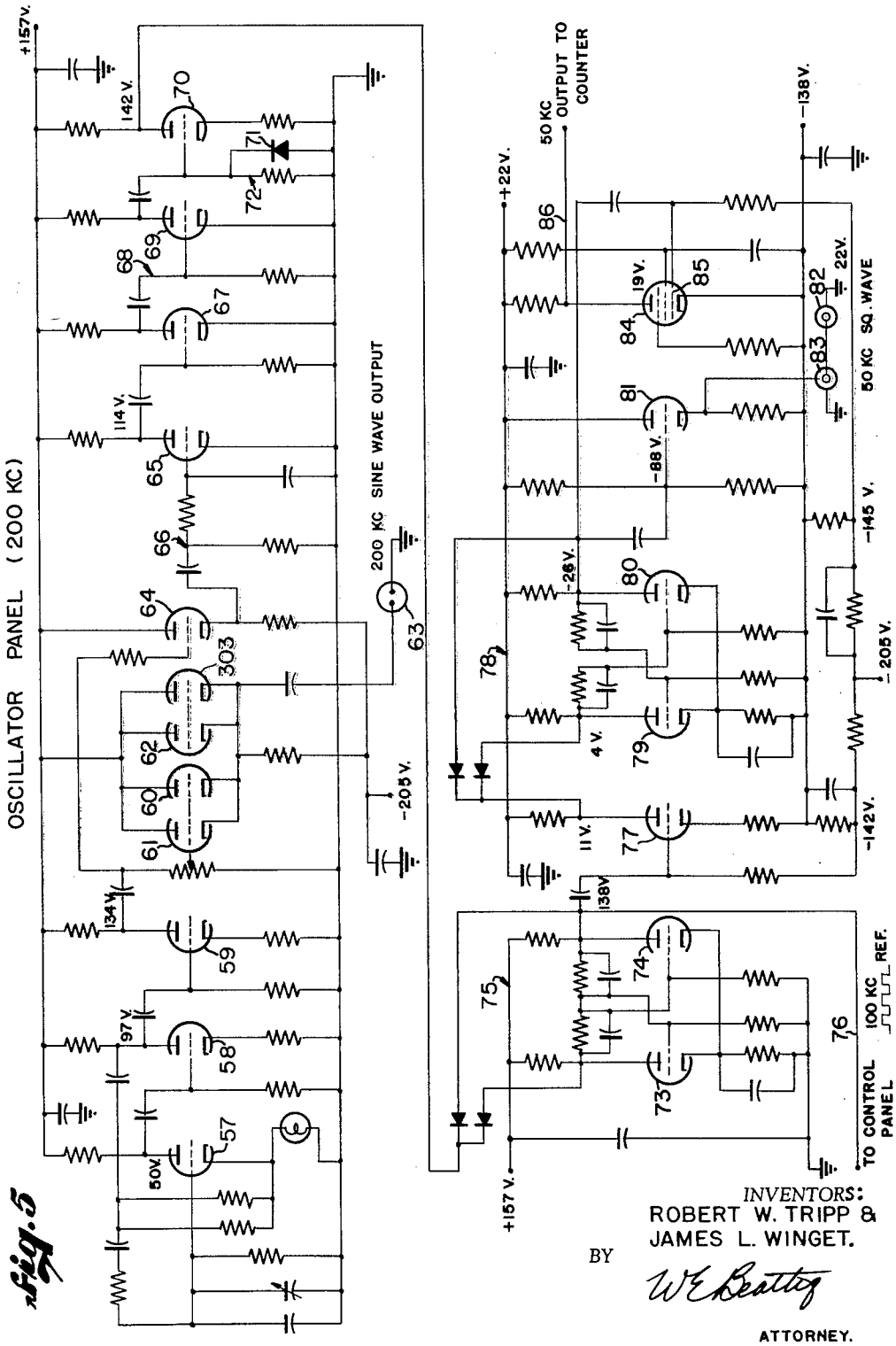

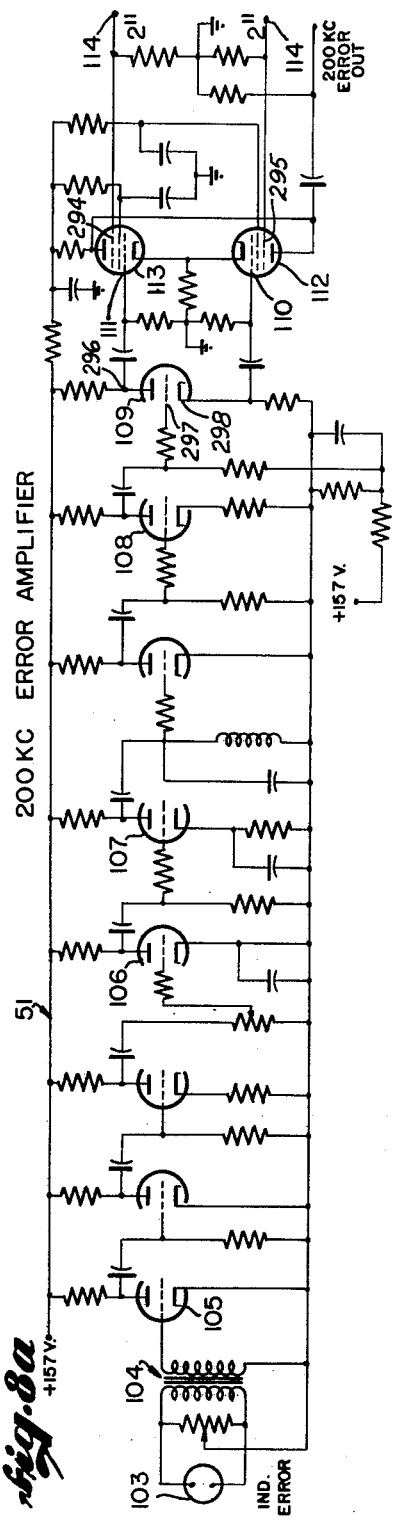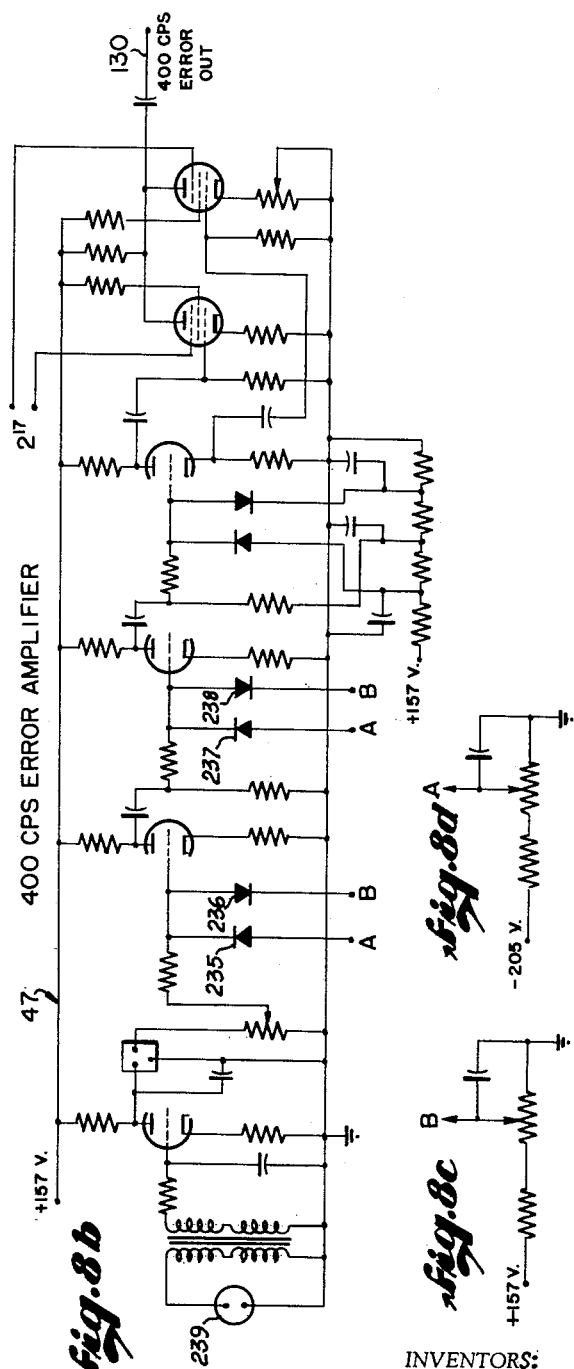
INVENTORS:
ROBERT W. TRIPP &
JAMES L. WINGET.
BY W. E. Beatty
ATTORNEY.

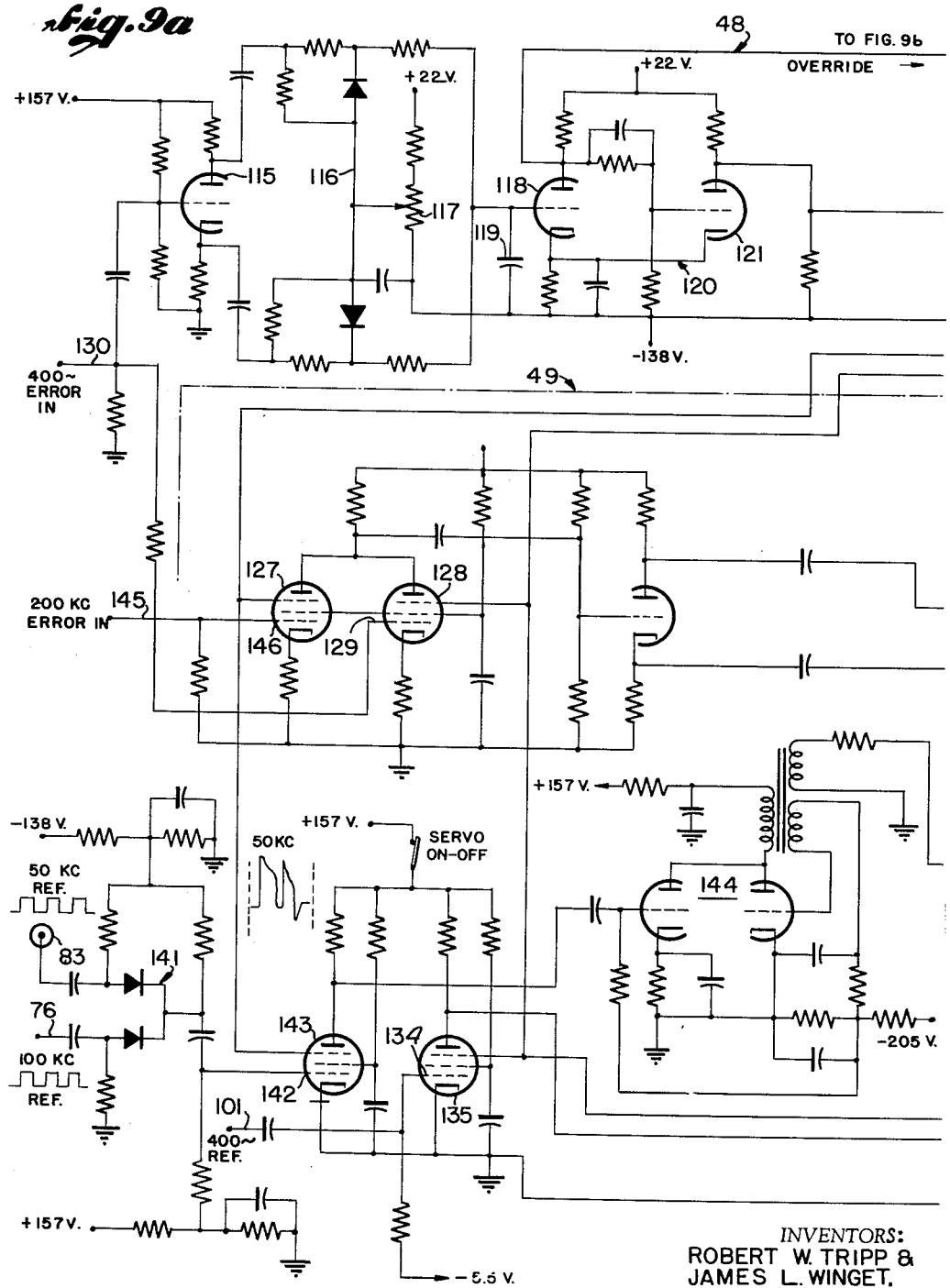

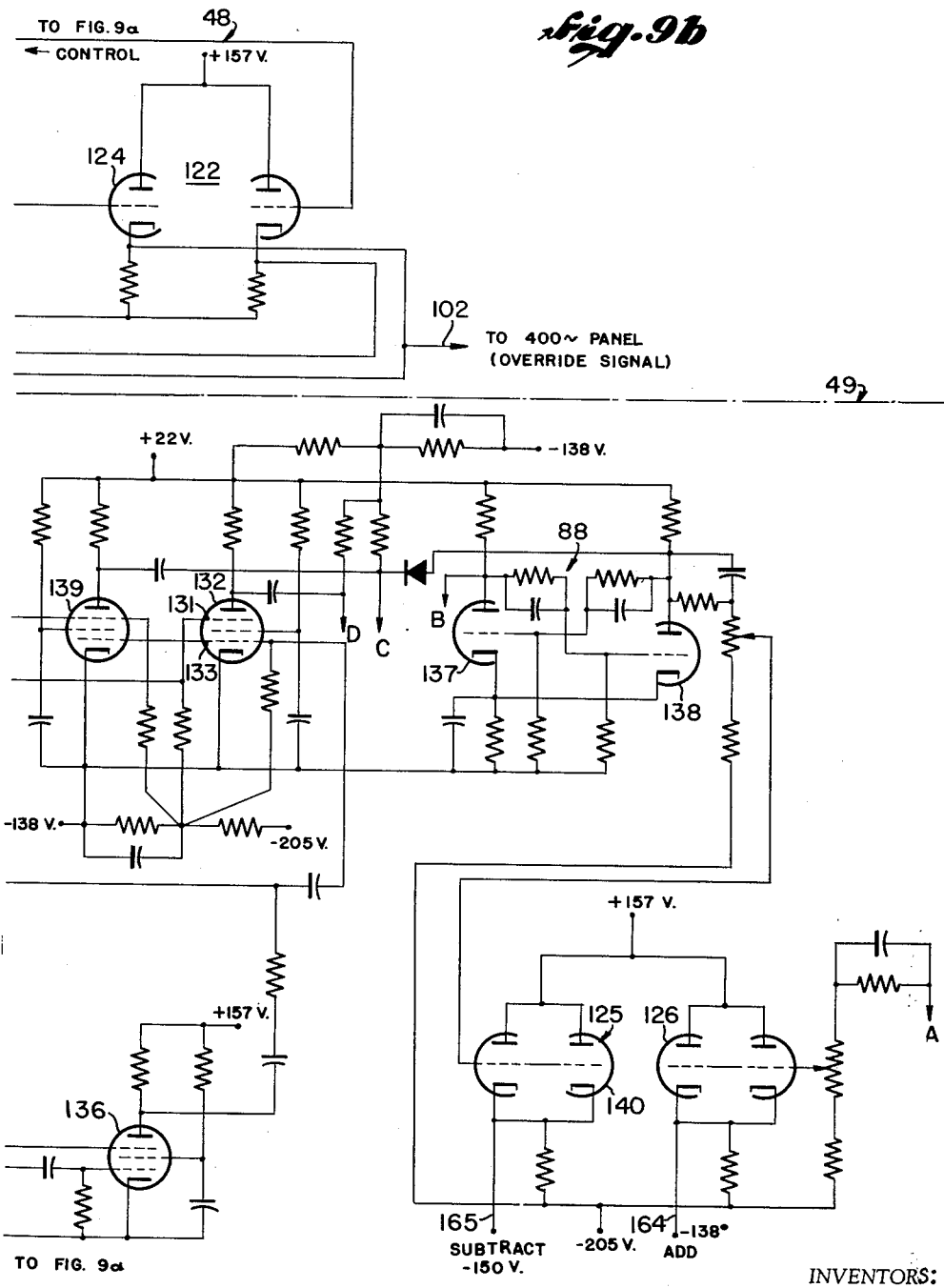

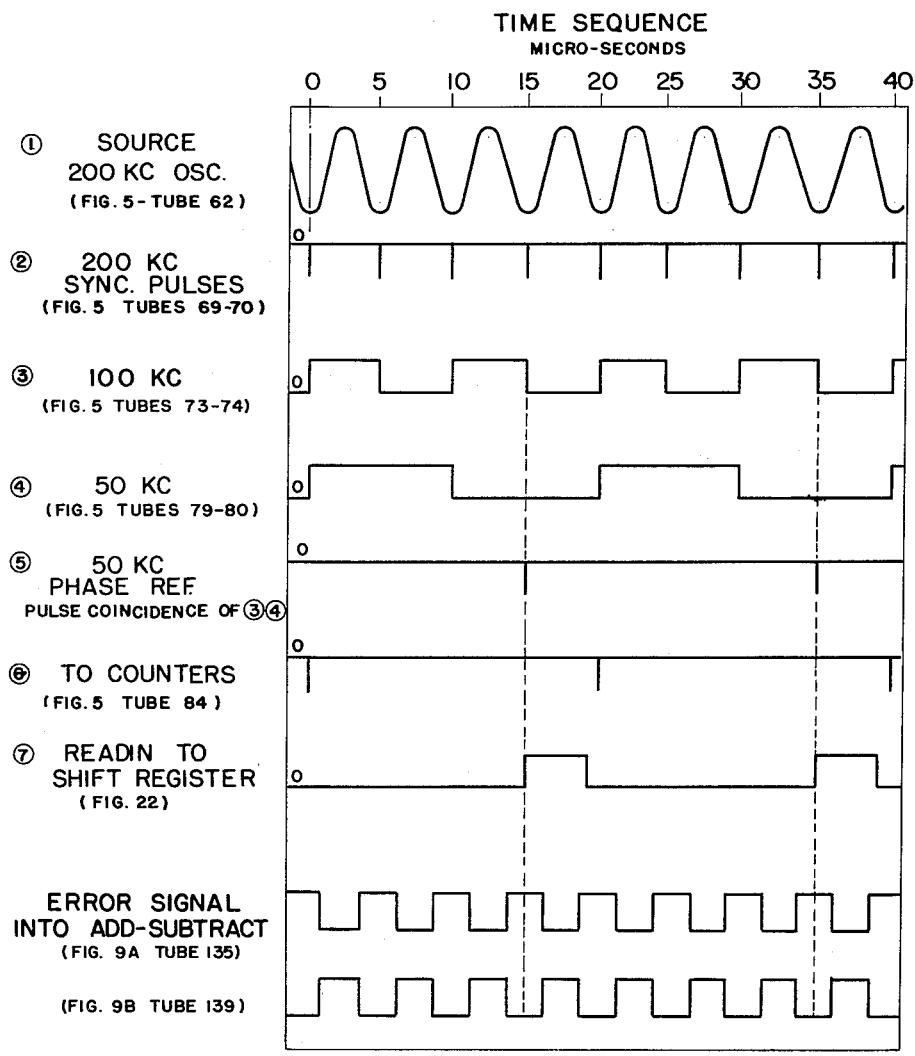

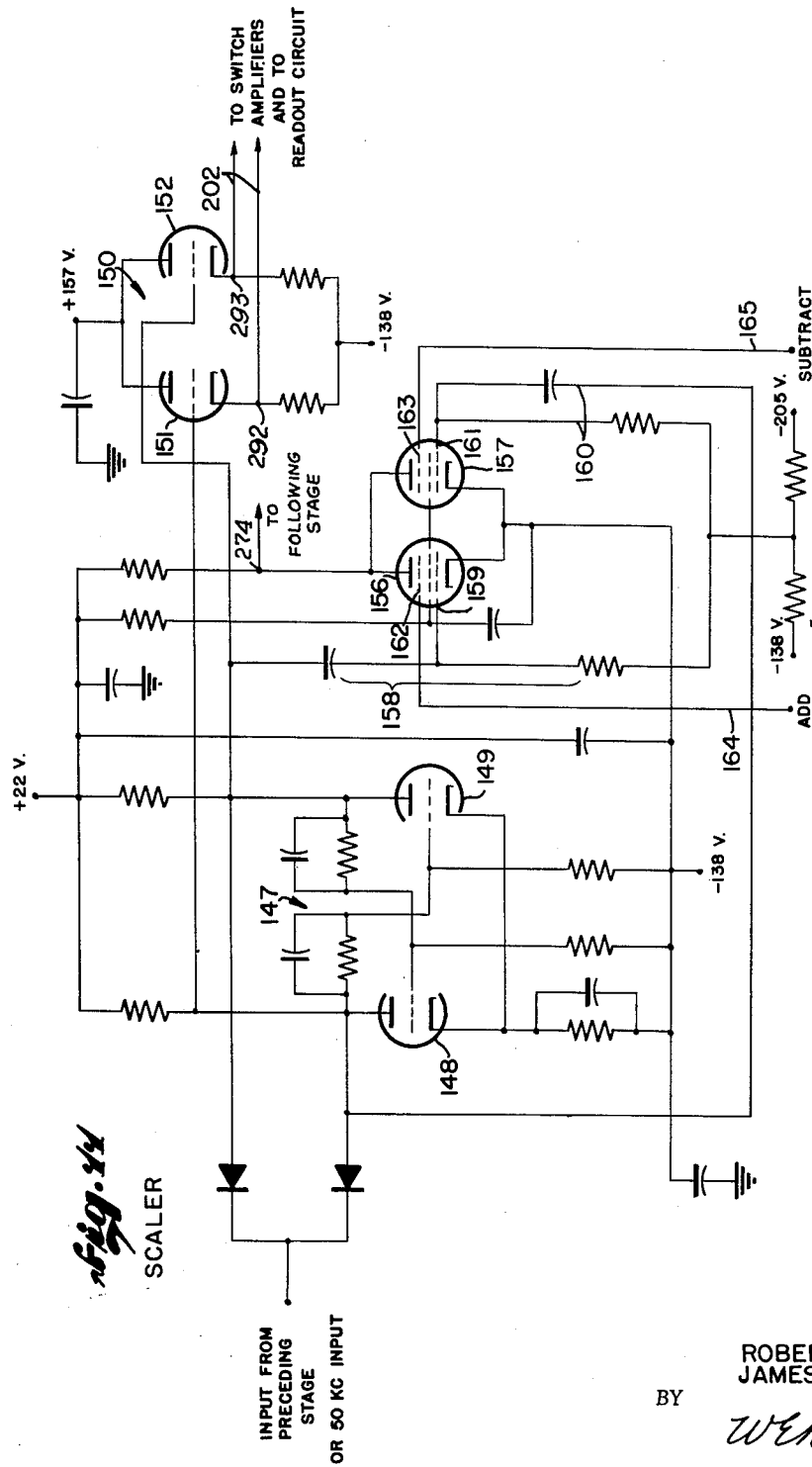

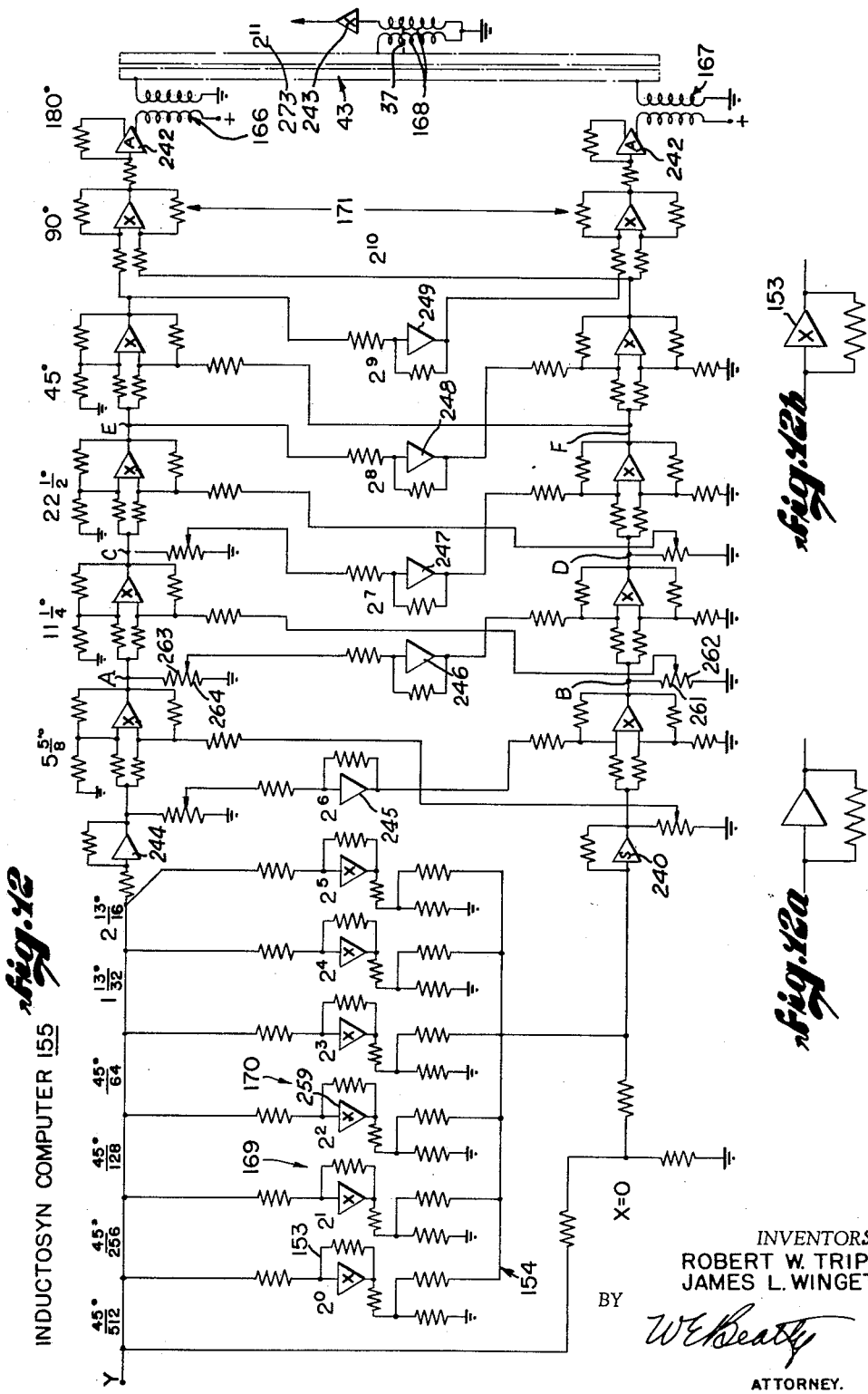

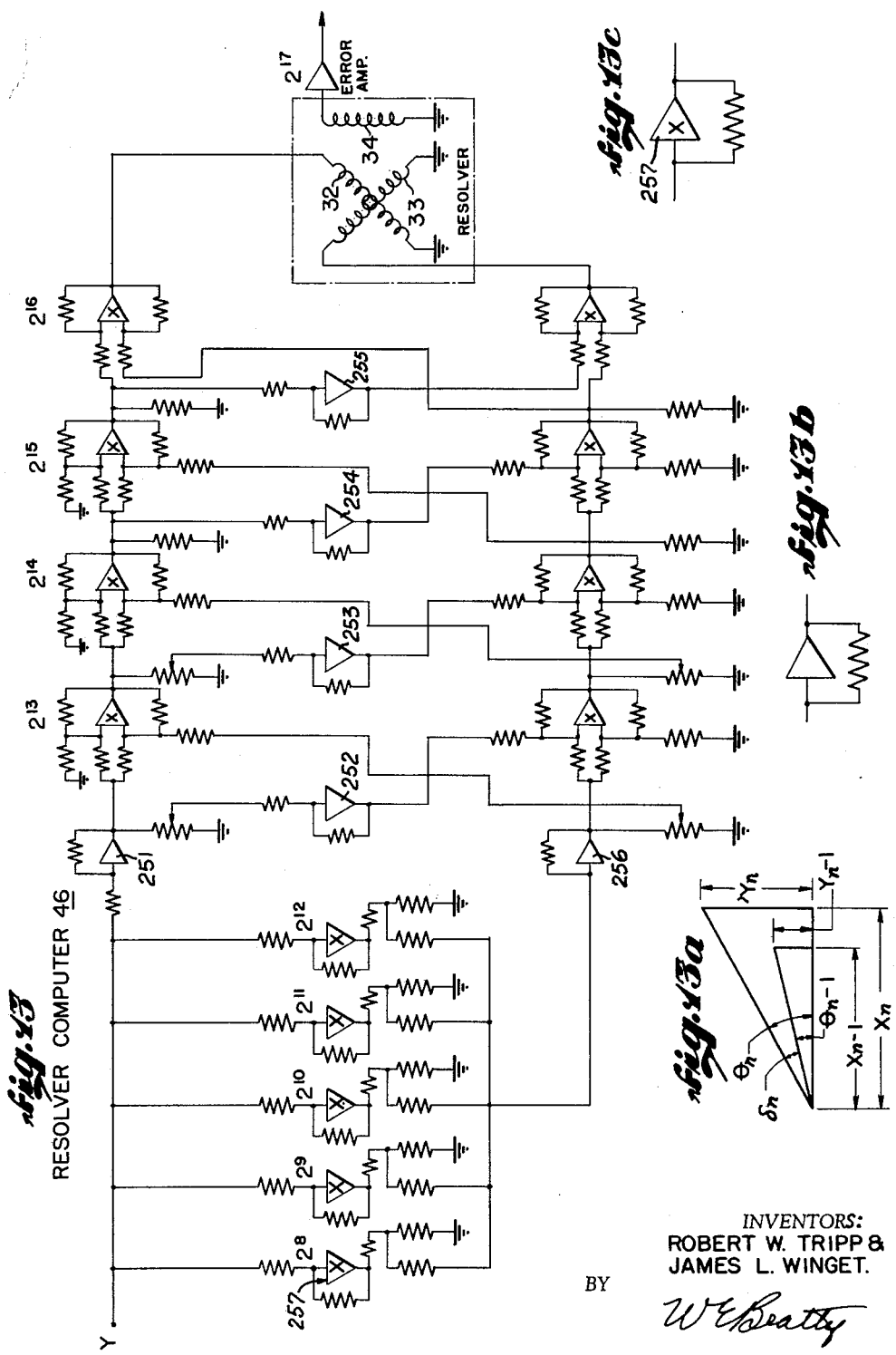

July 17, 1962  R. W. TRIPP ETAL  3,045,230
ANALOG-DIGITAL CONVERTER
Filed March 12, 1958  19 Sheets-Sheet 13

SWITCH AMPLIFIER FOR INDUCTOSYN COMPUTER (FIG. 12)

MULTIPLE INPUT FEEDBACK AMPLIFIER (200 KC)

*INVENTORS:*
ROBERT W. TRIPP &
JAMES L. WINGET.

BY  W E Beatty

ATTORNEY.

July 17, 1962

R. W. TRIPP ET AL 3,045,230

ANALOG-DIGITAL CONVERTER

Filed March 12, 1958

FEEDBACK AMPLIFIER

INPUT

OUTPUT

BX FEEDBACK AMPLIFIER (200 KC)

TO OUTPUT TRANSFORMER

INVENTORS:
ROBERT W. TRIPP &
JAMES L. WINGET.

BY *W. E. Beatty*

ATTORNEY.

July 17, 1962 R. W. TRIPP ETAL 3,045,230
ANALOG-DIGITAL CONVERTER
Filed March 12, 1958 19 Sheets-Sheet 15

SWITCH AMPLIFIER
FOR
RESOLVER COMPUTER

FEEDBACK
AMPLIFIER
(400 CYCLES)

MULTIPLE UNIT
FEEDBACK
AMPLIFIER
(400 CYCLES)

INVENTORS:
ROBERT W. TRIPP &
JAMES L. WINGET.
BY
W. E. Beatty
ATTORNEY.

July 17, 1962 R. W. TRIPP ETAL 3,045,230
ANALOG-DIGITAL CONVERTER
Filed March 12, 1958 19 Sheets-Sheet 16

INVENTORS:
ROBERT W. TRIPP &
JAMES L. WINGET.
BY
W E Beatty
ATTORNEY.

July 17, 1962  R. W. TRIPP ETAL  3,045,230
ANALOG-DIGITAL CONVERTER
Filed March 12, 1958  19 Sheets-Sheet 17
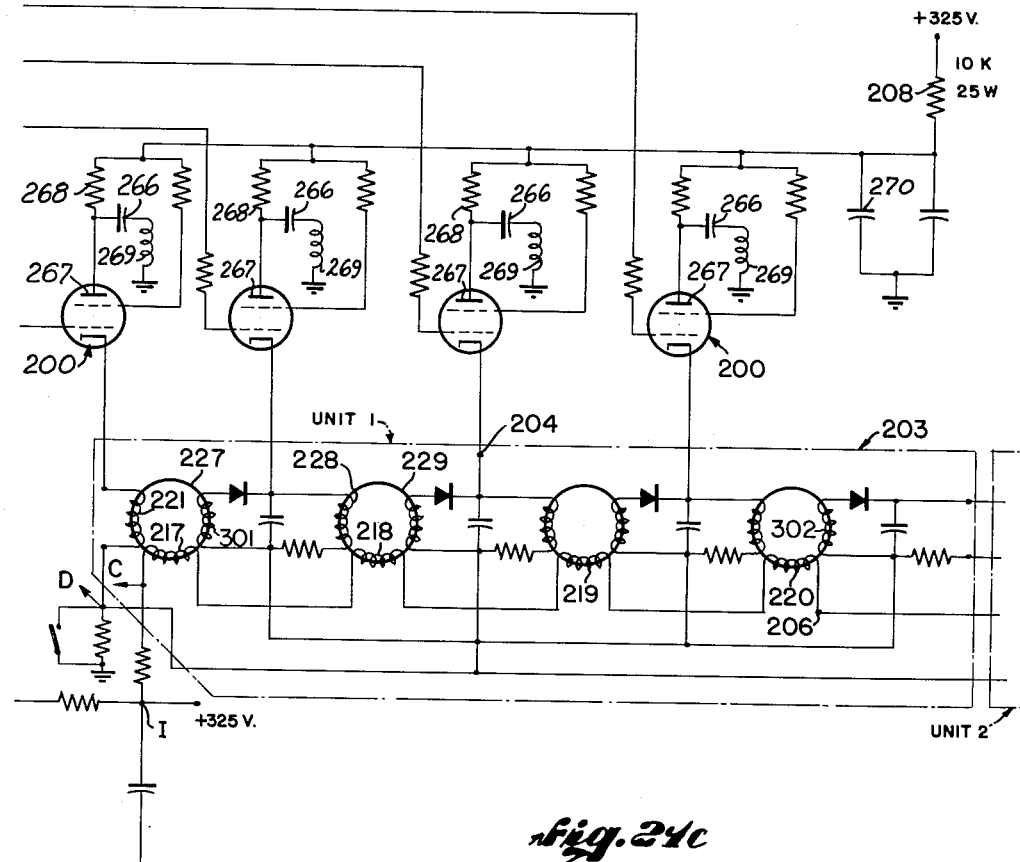
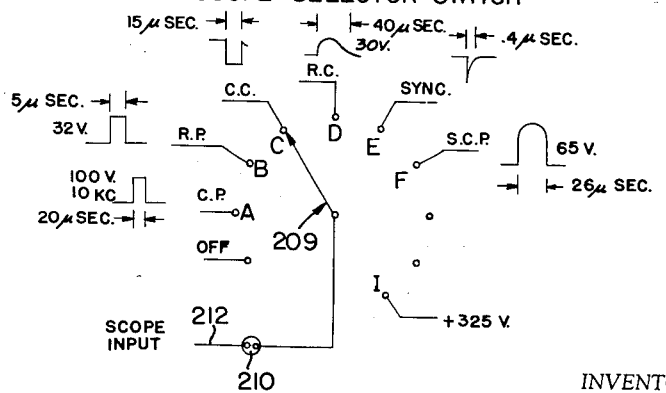
INVENTORS:
ROBERT W. TRIPP &
JAMES L. WINGET.
BY
W. E. Beatty
ATTORNEY.

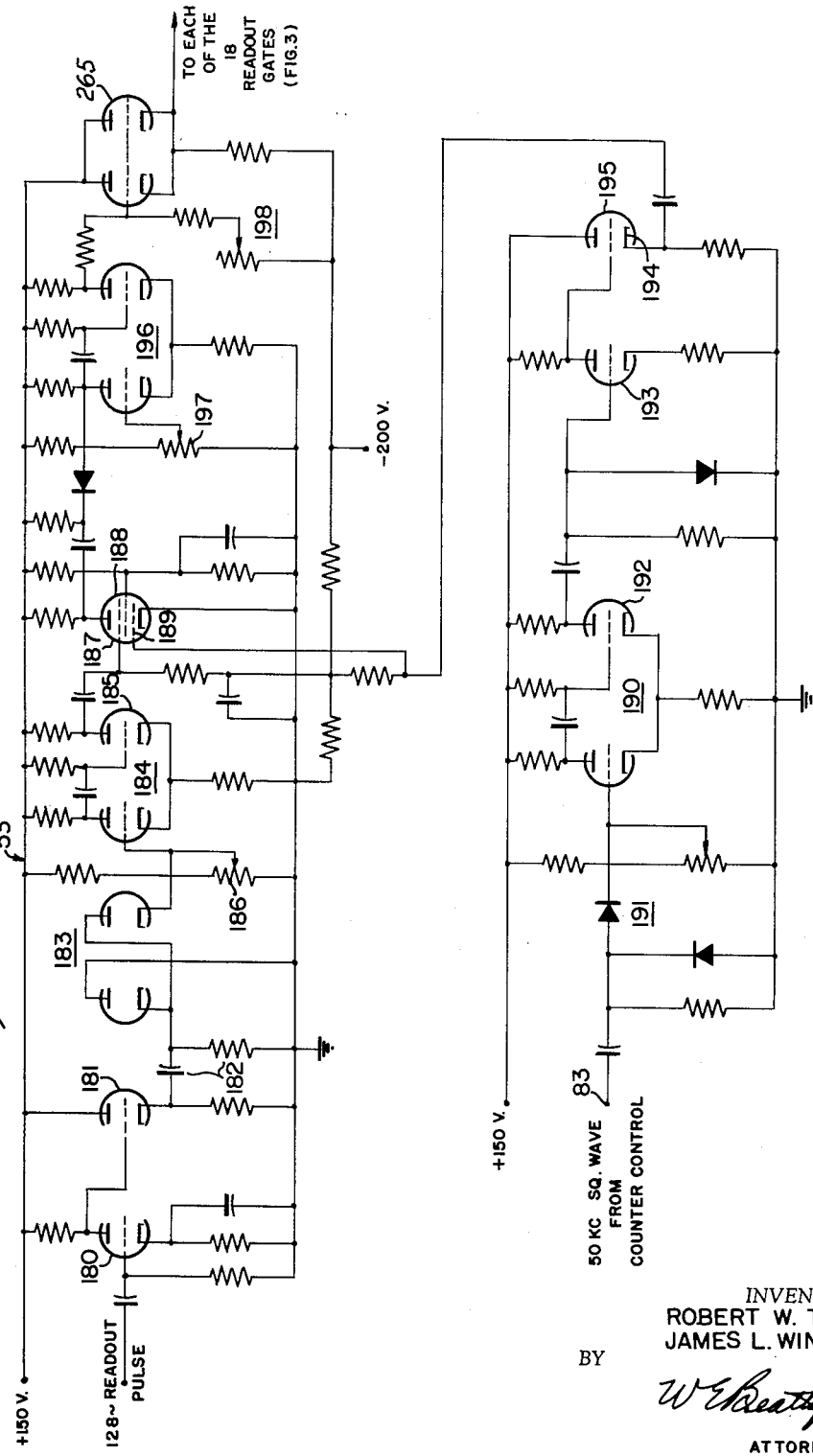

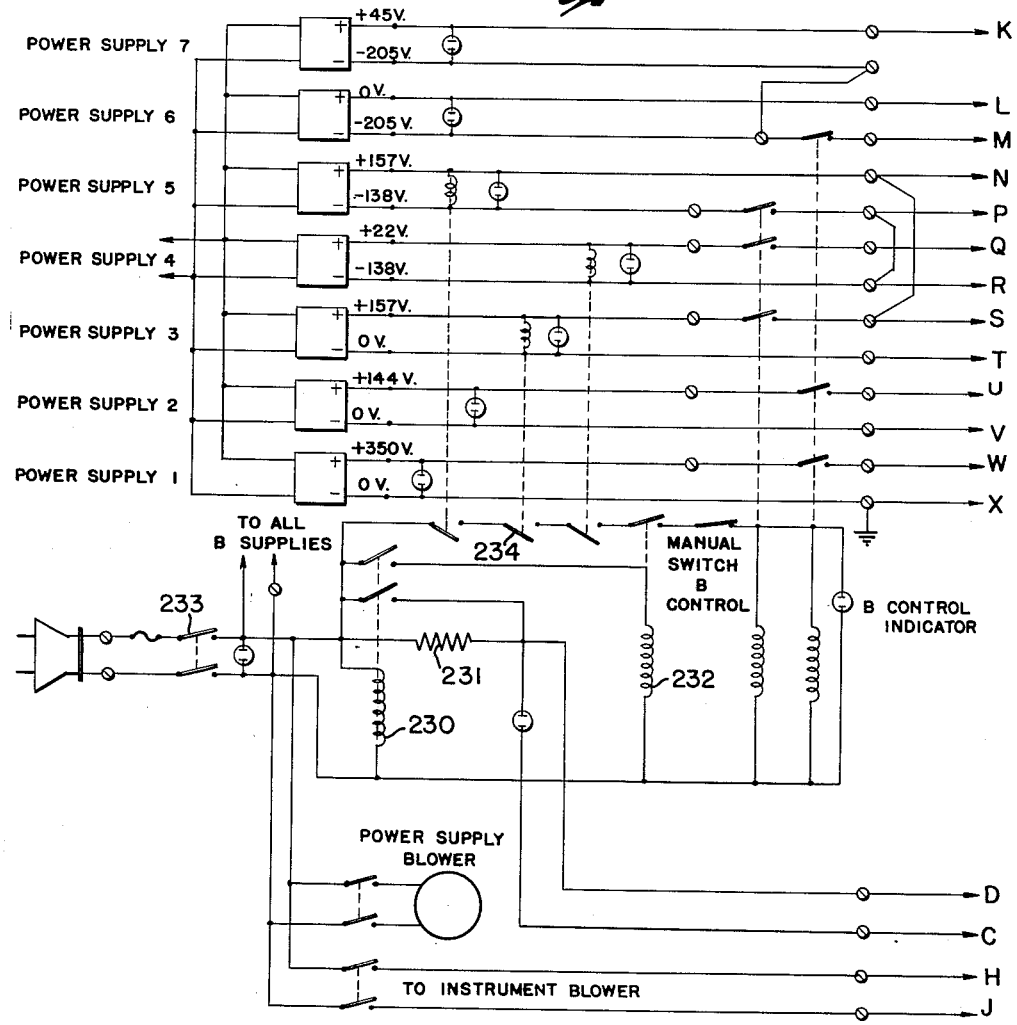
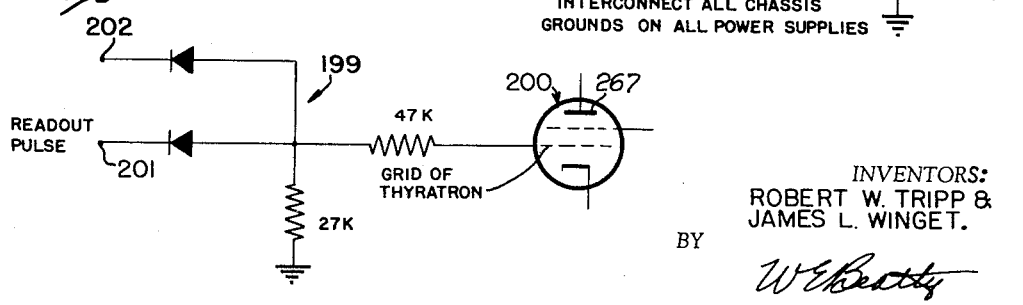

3,045,230
ANALOG-DIGITAL CONVERTER
Robert W. Tripp, Bronxville, and James L. Winget, Harrison, N.Y., assignors to Inductosyn Corporation, Carson City, Nev., a corporation of Nevada
Filed Mar. 12, 1958, Ser. No. 720,949
7 Claims. (Cl. 340—347)

The invention relates to an analog-digital converter for converting a shaft rotation into electrical digital form.

It is frequently necessary to convert a shaft angle into some form of digital number that is suitable for a particular computer. While these results can be obtained by photographing the scales of an accurately divided circle, together with some form of time reference, and later manually converting this information to digital form and storing it on punched cards or the like, this is a long laborious process and subject to operator errors.

An object of the invention is to obtain the angles, in digital form, directly from the shaft rotation. The angle data can be recorded, together with the necessary time reference, on film, magnetic tape, or any other convenient and suitable medium.

Theoretically, a shaft rotation can be divided into digital form by the use of a set of suitable commutators. That is, one commutator would have 2 segments, the next 4, the next 8 and the next 16 and so on—when the digital information is to be transformed into binary form. Obviously this method is limited by the number of segments that it is practical to place within a reasonable space on a commutator. This problem can be at least partially solved by incorporating gearing mechanisms to operate some of the commutator segments at speeds that are some power of 2 higher than those of the input shaft with the corresponding smaller number of segments required. Again, this method is limited by the practical accuracies that can be obtained with gears. This accuracy will depend upon the space available and the life that is expected of the equipment (gear wear). However, for most reasonable-size equipment, accuracies of about one minute can be expected.

The problem of a high accuracy analog-digital converter could be solved, through the development of an accurate gear step-up of high ratio such as about 64 to 1. This would make it possible to build a system, using commutators, to an overall accuracy of a few seconds. The invention makes this possible by the use of Inductosyn [1] as data-transmission components. Basically, the Inductosyn is an inductive device with many of the characteristics of an ordinary two-phase synchro or resolver—two important differences being that the Inductosyn has a very high accuracy and is a multiple-pole device. The Inductosyn is a 1-speed device (direct-shaft driven) but the voltages and synchronous points of the system are similar to those that would be observed in an ordinary two-phase resolver system using a gear ratio such as 64:1.

In Inductosyn in the system may be compared to a highly accurate resolver (one minute of arc) geared up 64 times without any gearing error. The Inductosyn is mounted directly on the input shaft. The Inductosyn consists of two flat, round, glass disks having printed conductor patterns. One disk, the rotor, contains one pattern only, corresponding to the single secondary winding of the 400-cycle resolver described later, and employed in the coarse portion of the preferred form of the invention. The other disk contains two patterns in space quadrature, corresponding to the primary winding of the resolver. The Inductosyn type of position measuring transformer is described and claimed in Patent 2,799,835 dated July 16, 1947 which discloses both linear and rotary forms. The rotary form is used in the present invention for the transmission and repetition of angular position data. The windings on the disks have one pole per conductor and an air core, the secondary voltage varying in magnitude according to the relative angular position of the disks over a cycle measured by an angular spacing center-to-center of three adjacent radial conductors on the rotor disk. The Inductosyn is similar in action to a resolver, but having a larger number of poles. For example, the Inductosyn may have 128 poles or 64 pole cycles per 360° of the Inductosyn rotor.

Since the inherent accuracy of the Inductosyn is a few seconds of arc at any point within 360 degrees of rotation, and the accuracy of the resolver can be a few minutes of arc, a gear ratio that is sufficiently accurate for the analog-digital converter is obtained.

The system described up to this point would seem to meet the requirements of an analog-digital converter of high accuracy. There is one serious drawback however. Suppose that it is desired to work to an accuracy of five seconds of arc. This means that the circle would be divided $2^{18}$ or 262,144 parts. (There are 1,296,000 seconds in a circle). By limiting the number of segments on a commutator to 64 the required gear ratio between the 1-speed input shaft and the last set of commutators would be 4096. This means that with the input shaft rotating at 1 r.p.m., the highest speed commutator sections would rotate at 4096 r.p.m. This limits the possible speed of the input shaft. Otherwise this system should be quite practical.

The invention makes it possible to obtain this digital information at somewhat higher speeds. For this purpose, the seven highest-speed commutators would be eliminated and the required information is obtained from another Inductosyn, mounted directly on the 1-speed shaft. This is done as follows:

An Inductosyn on the input shaft is used as a receiver. The transmitter is a set of voltages obtained from a binary counter replacing the seven digits dropped off by the above seven commutator segments. This set of voltages is applied to the two stator windings of the Inductosyn. The error voltage from the Inductosyn operates a gate allowing the counter to advance the voltages on the Inductosyn in the same manner as would be done by manually rotating an Inductosyn transmitter. The counter would continue counting (forward or backward as the case may be) until the error voltages reach null. In this way, the correct count would be set up for the present angle of the Inductosyn and the remaining eleven commutator segments. The principles of the circuitry and general arrangement are shown in FIG. 1 for such a system, that would be capable of operating up to about 10 r.p.m. of the input shaft. This corresponds to about 40,000 counts per second.

In the preferred form of the invention shown in FIGS. 2 to 24, the coarse portion of the system employs a resolver as an error measuring means of the coarse system and a 1-speed (direct shaft driven) Inductosyn having 64 synchronous points is employed as the error measuring means of the fine system. Both the coarse resolver and the fine Inductosyn operate on the same principle as the fine portion of the form of invention in FIG. 1, as follows: Advantage is taken of the fact that if two voltages whose amplitude ratio is proportional to the tangent of an angle $\theta$, are impressed across the two members of the primary winding, the voltage across the secondary winding will be a sine function of the position of the input shaft with which the secondary winding rotates. This is explained as follows: Assuming that a voltage "sin $\theta$" is applied to one input winding and a voltage "cos $\theta$" to the second input winding, the amplitude ratio is sin $\theta$/cos $\theta$, or tan $\theta$.

[1] Trademark.

The voltage induced in the secondary winding, with the resolver turned to any angle X, will be—

$$V = \sin\theta \cos X + \cos\theta \sin X$$

hence, $$V = \sin(\theta + X)$$

Thus the amplitude of the voltage across the secondary winding will be a sine function of the shaft position X, space phase-shifted from zero reference by the fixed angle $\theta$. The secondary voltage will be zero when the resolver shaft is in position $\theta$ (or $\theta + 180°$). There will be a 180° phase shift in the output voltage, depending upon whether the angular position of the input shaft is larger or smaller than $\theta$.

The counter has a number of distinct stages, each of which controls or supplies to the two primary windings, voltages in different ratios corersponding to the angle of the input shaft. The secondary winding supplies an error current which operates through an add-subtract control to cause the counter to count forward or backward in a direction to reduce the current in the secondary winding to zero, which will be true when the resolver shaft is in the position $\theta$ (or $\theta + 180°$). The phase of such error current determines whether the count is forward or backward, the converter constituting a form of servo system which oscillates around the correct angle with an amplitude of one count at the frequency at which the counter is pulsed.

For further details of the invention, reference may be made to the drawings wherein, FIG. 1 is a block diagram of a system embodying one form of the invention, the preferred form being shown in the remaining figures. In FIG. 1, the system has both coarse and accurate portions, the coarse portion including the use of commutators. No commutator is used in the preferred form of the invention in FIGS. 2 to 24. The principles of the accurate portion of FIG. 1 are applied to both the coarse and the accurate systems of the preferred form in FIGS. 2 to 24.

FIG. 2 is a simplified block diagram of the preferred form of analog-digital converter.

FIG. 3 is an overall block diagram corresponding to FIG. 2 and showing further details of a binary counter.

FIG. 4 is a block diagram which is a simplified version of the diagram in FIG. 3.

FIG. 5 is a schematic circuit of the oscillator panel 200-kc.

FIG. 6 is a schematic block diagram of a portion of the oscillator panel of FIG. 5, the points marked "A," "B," "C" and "D" going to corresponding points, similarly marked on the FIG. 9b portion of the control panel circuit of FIGS. 9 and 9b, these two figures fitting together as indicated.

FIG. 7 is a schematic diagram of the circuit for the oscillator panel, 400 cycles.

FIG. 8a is a schematic circuit of the 200-kc. error amplifier.

FIG. 8b is a schematic circuit of the 400 c.p.s. error amplifier, shown at $2^{17}$ in FIG. 13.

FIGS. 8c and 8d show circuit details for connection to the circuit of FIG. 8b at the points A and B as indicated in these figures.

FIGS. 9a and 9b are described in connection with FIG. 6, and include the add-substract control.

FIG. 10 is a schematic chart showing the timing sequence for the 200-kc. system, useful for explaining the advance of the counter and the decision whether to add or subtract the next count.

FIG. 11 is a schematic circuit showing a typical counter stage of one of 18 equal stages in the binary counter, namely, a scaler with add-subtract control.

FIG. 12 is a schematic diagram of the fine, or "Inductosyn" computer.

FIG. 12a is a schematic showing of a 200-kc. feed back amplifier and FIG. 12b is a schematic showing of a 200-kc. switch amplifier illustrated by corresponding showings in FIG. 12.

FIG. 13 is a schematic circuit of the resolver computer.

FIG. 13a is a diagram useful in explaining the fine or "Inductosyn" computer of FIG. 12 and the resolver computer of FIG. 13.

FIG. 13b schematically illustrates a 400 cycle feed back amplifier and FIG. 13c schematically illustrates a 400 cycle switch amplifier employed in the corresponding showings in FIG. 13.

Figure 14:
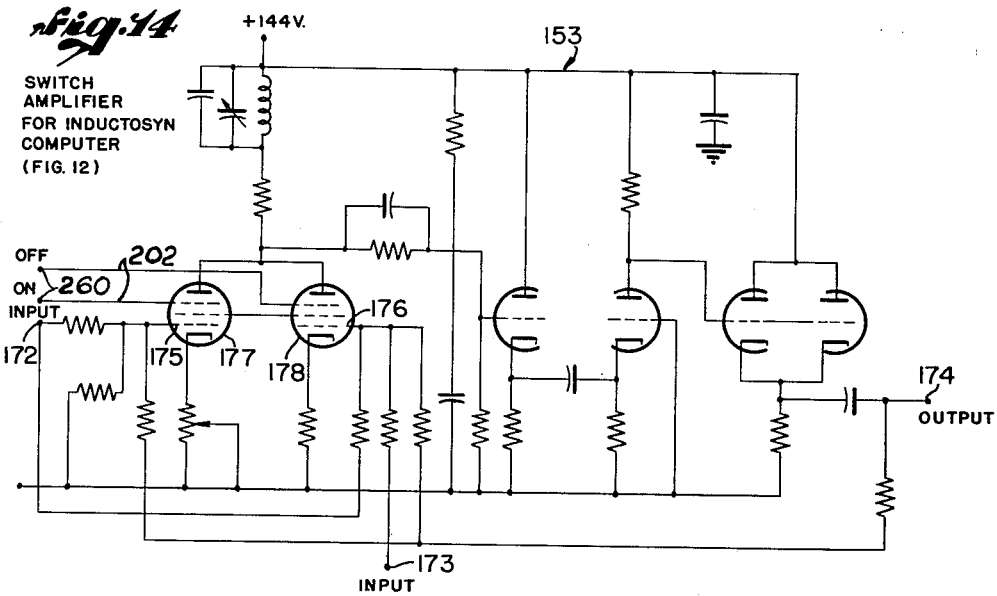
Figure 14A:

FIGS. 14 and 14a are schematic circuits of the switch amplifier for the "Inductosyn" computer of FIG. 12. The feed back amplifier of FIG. 14 is in the sixth stage of the Y channel to change the sign to correspond to the fine change in the X channel.

Figure 15:
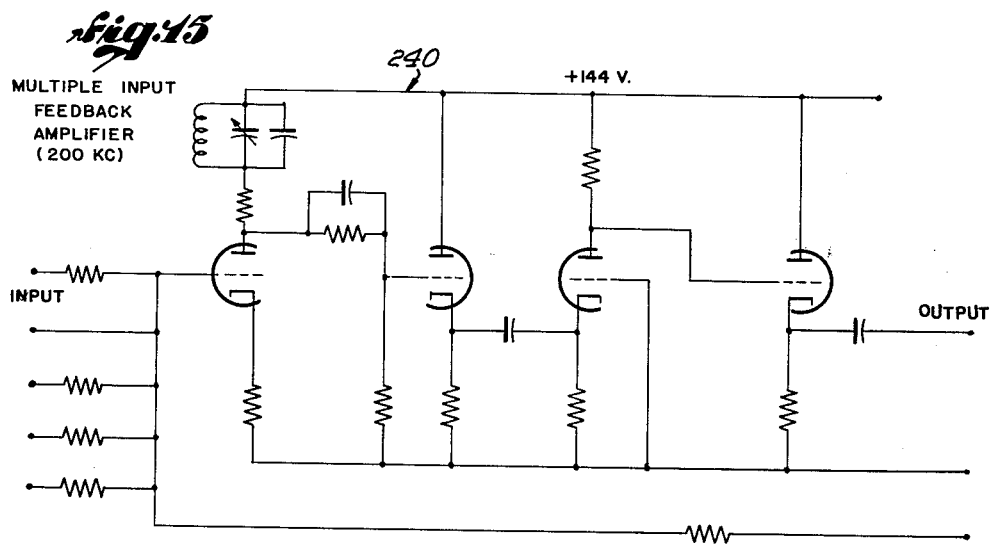
Figure 15A:

FIGS. 15 and 15a are schematic diagrams of the multiple input feed back amplifier (200-kc.).

Figure 16:
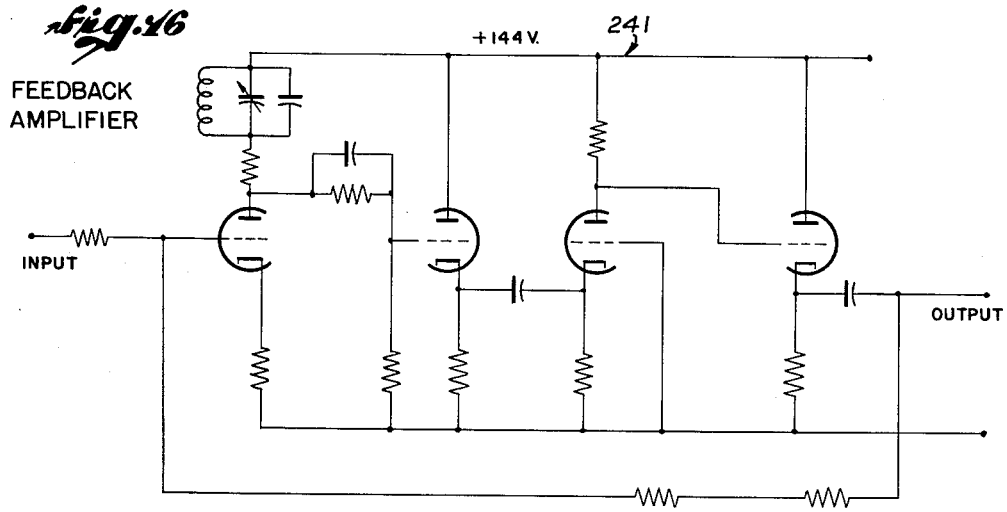

FIG. 16 is a schematic circuit of the feed back amplifier (200-kc.). The feed back amplifier of FIG. 16 sums up all the X inputs to the sixth stage.

Figure 17:
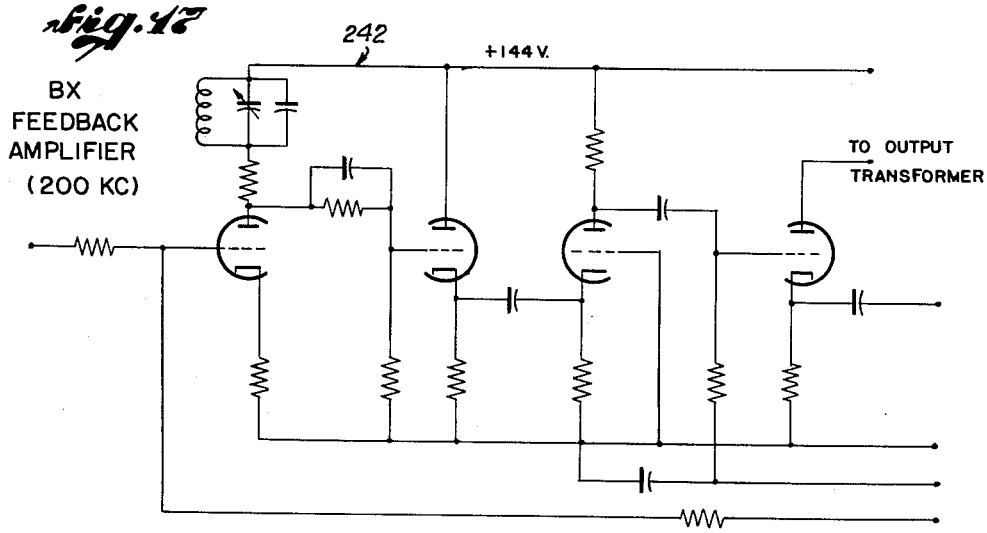

FIG. 17 is a schematic circuit of the B$x$ feed back amplifier (200-kc.).

Figure 18:
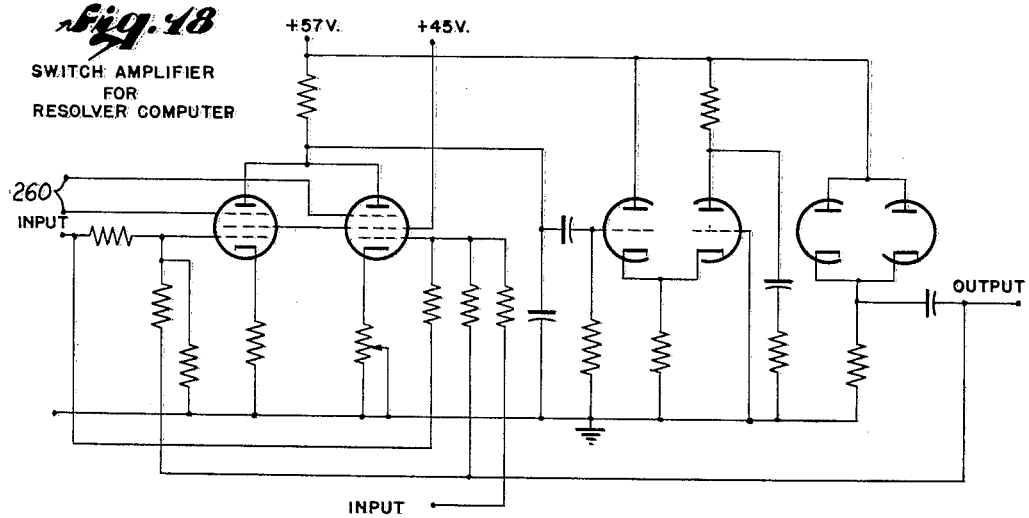

FIG. 18 is a schematic circuit of the switch amplifier for the resolver computer, symbolized as in FIG. 13c.

Figure 19:
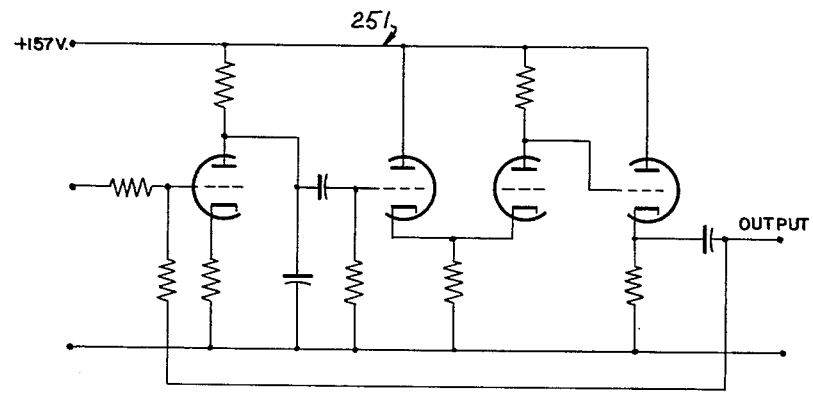

FIG. 19 is a schematic circuit for the feed back amplifier (400 cycles).

Figure 20:
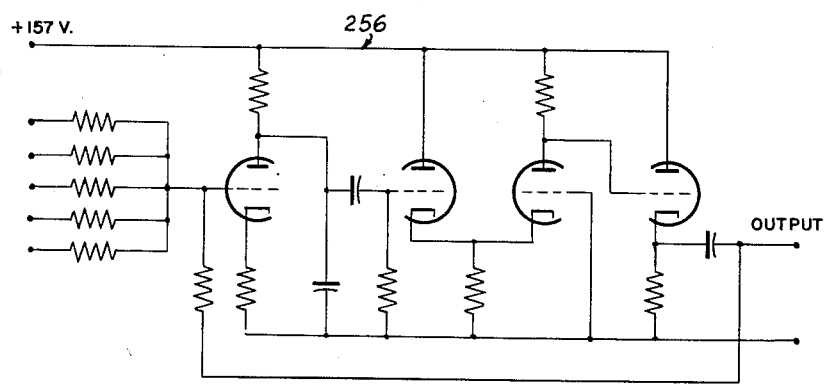

FIG. 20 is a schematic circuit of the multiple input feed back amplifier (400 cycles).

Figure 21A:
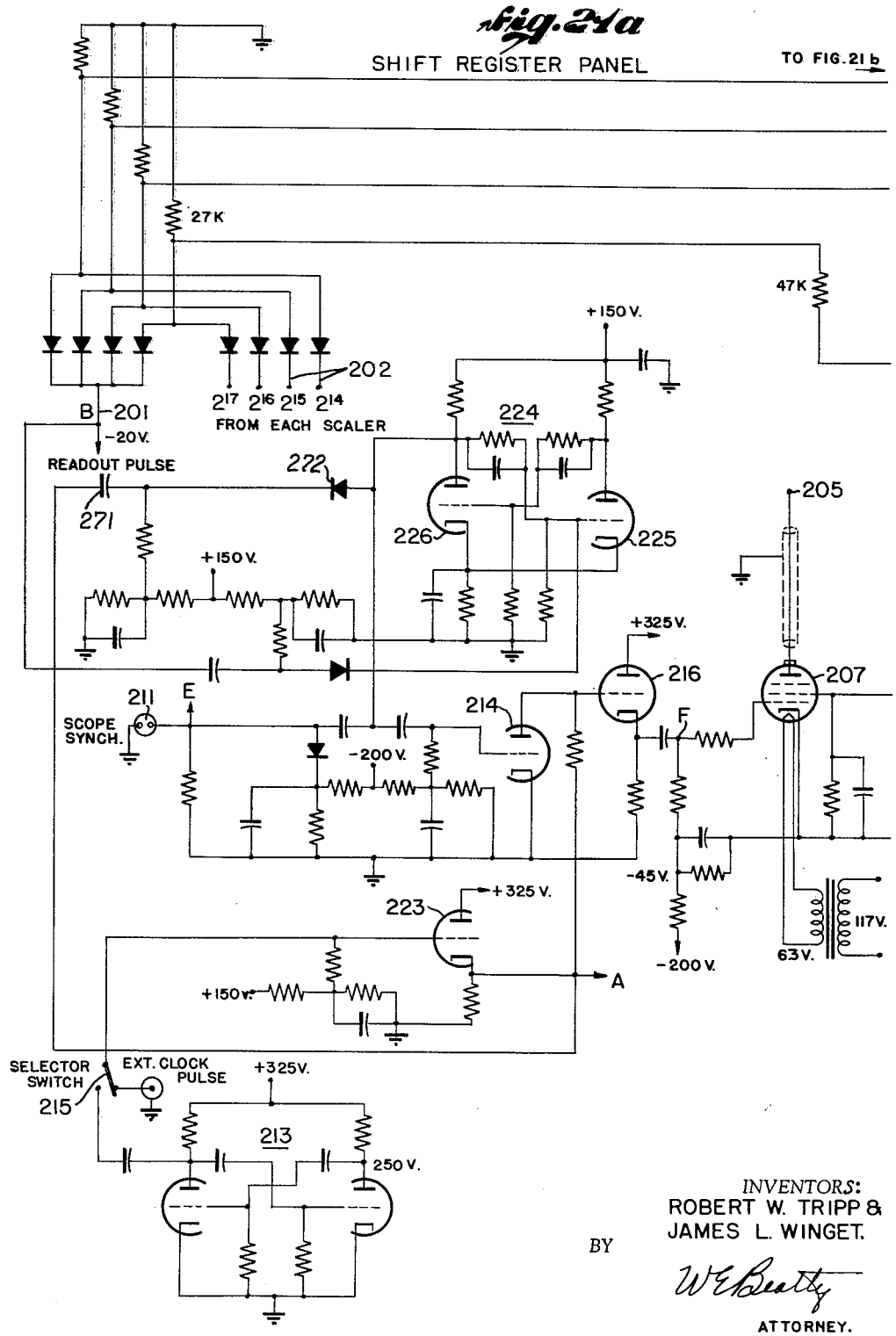

FIGS. 21a, 21b and 21c are schematic circuits for the shift register panel.

FIG. 22 is a schematic circuit for the readout synchronizer.

The circuits of FIGS. 21 and 22 contain all the circuitry for the readout synchronizer, the readout gates, the internal 10-kc. clock generator, the clock pulse gate, and the magnetic shift register.

Schematic showings are: FIG. 23, coincidence circuit; FIG. 24, power supply control.

*FIG. 1.—Block Diagram, Analog-Digital Converter*

Referring in detail to FIG. 1 of the drawings, the coarse portion of the system employing commutators will be only briefly described as this is not the preferred form, and also the fine portion of the system employing an Inductosyn control will only be briefly described at this point because the same type of control is applied to both the coarse and fine portions of the preferred form in FIGS. 2 to 24.

In FIG. 1, the rotation of input shaft 36 is converted or translated into digital form, namely a binary number readable at output 10 of a shift register 11, controled by a series of reading gates indicated at 12 having a timer read gate control 13. The counter indicated at 14 is shown as having 18 stages from $2^0$ to $2^{17}$, of which the coarse stages $2^5$ to $2^{17}$ are controlled by the 256-speed commutator 15, the 16-speed commutator indicated at 16 and the 1-speed commutator 17. The section of the commutator drums in the rectangle 18 can be placed on shaft 36, eliminating the 1-speed input system indicated at 19. The rotor 20 of 64-speed Inductosyn 21 and the rotor 22 of 64-speed Inductosyn 23 are fixed on the input shaft 36. Inductosyn 21 is excited by a 1-speed resolver 24 having a rotor 25 fixed to the shaft 26 of servo motor 27 which drives the drums or commutators 15, 16 and 17. Motor 27 drives the drums 15, 16 and 17 to a position to reduce the error current from amplifier 28 to zero, and in so doing operates the coarse section of counter 14 to establish the coarse portion of a binary count corresponding to the rotation of shaft 36. The error amplifier 28 receives its instruction from the Inductosyn 21 and from the 1-speed receiver 29.

To correct the count in FIG. 1 to a greater accuracy, the 128 pole Inductosyn 23 has its rotor mounted on shaft 36. Stator voltages for Inductosyn 23 are obtained from a series of counter controlled amplifiers indicated at 90, the various stages of these amplifiers supplying co-function currents or potentials in various proportions corresponding to the angular displacement of the rotor of Inductosyn 23 required to reduce its error current, supplied to amplifier 91, to zero. The error signal from Inductosyn 23 is amplified by amplifier 91 and employed to control the pulse train feeding to the counter 14. The phase of the error signal controls a phase detector 92 which controls the add-subtract gate control 93, to make the counter count forward or backward to attain a count corresponding to zero error current appropriate to a particular position of the shaft 36.

In FIG. 1, the commutators 15, 16 and 17 and their associated direct-coupled binary counters 14 are arranged in such a way that the actual flip-over of any stage is controlled by the flip-over of the next-finer stage. Being direct-coupled, this type of circuit does not depend on the accumulation of a count to arrive at the correct answer. The correct count is available immediately after the equipment is fully operable. The output of this device is directly in binary form, no translator being required to convert the information.

The description will proceed under the following headings.

Column

FIG. 2. Simplified Block Diagram, Analog-Digital Converter _____ 5
Table I. Digital-Analog Conversion _____ 6
Theory of Operation _____ 7
200-kc. Oscillator Panel _____ 9
400 c.p.s. Oscillator Panel _____ 10
Error Panel _____ 10
Control Panel _____ 11
Fine Control _____ 13
Counter _____ 13
Computer _____ 15
Shift Register Panel _____ 18
Power Supply _____ 21

*FIG. 2.—Simplified Block Diagram, Aanalog-Digital Converter*

A resolver is a two-phase synchro. It is a precision rotary signal transformer capable of 360° rotation. In the formed used here, resolver 31 has two primary windings 32 and 33 that are wound in space quadrature, and one secondary winding 34. The secondary winding 34 can be rotated with respect to the primary 32, 33. If voltage is applied to the single secondary winding 34, the amplitude of the voltage induced in the primary winding 32, 33 is proportional to the sine and cosine of the angular position of shaft 35. Conversely, if two voltages whose amplitude ratio is proportional to the tangent of an angle $\theta$, are impressed across the primary winding 32, 33, the voltage across the secondary winding 34 will be a sine function of the position of shaft 35. The secondary voltage will be zero when the resolver shaft 35 is in position $\theta$ or $(\theta+180°)$. There is a 180° phase shift in the output voltage, depending on whether the angular position of the resolver shaft 35 is larger or smaller than $\theta$. This property of a resolver is used in the analog-digital converter in the following manner: The resolver shaft 35 is rigidly coupled to the input shaft of which the angular position is to be determined in digital form, this input shaft being indicated at 36 in FIG. 1 and at 37 in FIG. 3. The secondary voltage can then be zero only if the ratio of the voltages Y and X, applied to the primary 32, 33 is equal to the tangent of the input angle.

Shaft rotation can be expressed in binary digital form by subdividing one revolution into 2, 4, 8, . . . $2^n$ segments. To simplify the discussion, assume that the highest subdivision is 64 or $2^6$ parts, so that the resolution is only 5⅝ degrees. The binary counter 38 in FIG. 2 would consist of six equal stages. Each stage can be in only one of the two possible states—"on" or "off." (Refer to Table I.)

TABLE I.—DIGITAL-ANALOG CONVERSION (SIX STAGES)

| Counter Stage | 1 | 2 | 3 | 4 | 5 | 6 | Angular Region Represented by Count, degrees | Center of Region, degrees |
|---|---|---|---|---|---|---|---|---|
| Counter Contribution | $2^0=1$ | $2^1=2$ | $2^2=4$ | $2^3=8$ | $2^4=16$ | $2^5=32$ | | |
| Angular Increment | 5⅝° | 11¼° | 22½° | 45° | 90° | 180° | | |
| Count: | | | | | | | | |
| 0 | 0 | 0 | 0 | 0 | 0 | 0 | 357³⁄₁₆ to 2¹³⁄₁₆ | 0 |
| 1 | 1 | 0 | 0 | 0 | 0 | 0 | 2¹³⁄₁₆ to 8⁷⁄₁₆ | 5⅝ |
| 2 | 0 | 1 | 0 | 0 | 0 | 0 | 8⁷⁄₁₆ to 14¹⁄₁₆ | 11¼ |
| 3 | 1 | 1 | 0 | 0 | 0 | 0 | 14¹⁄₁₆ to 19¹¹⁄₁₆ | 16⅞ |
| 4 | 0 | 0 | 1 | 0 | 0 | 0 | 19¹¹⁄₁₆ to 25⁵⁄₁₆ | 22½ |
| 5 | 1 | 0 | 1 | 0 | 0 | 0 | 25⁵⁄₁₆ to 30¹⁵⁄₁₆ | 28⅛ |
| 6 | 0 | 1 | 1 | 0 | 0 | 0 | 30¹⁵⁄₁₆ to 36⁹⁄₁₆ | 33¾ |
| 7 | 1 | 1 | 1 | 0 | 0 | 0 | 36⁹⁄₁₆ to 42³⁄₁₆ | 39⅜ |
| 8 | 0 | 0 | 0 | 1 | 0 | 0 | 42³⁄₁₆ to 47¹³⁄₁₆ | 45 |
| 9 | 1 | 0 | 0 | 1 | 0 | 0 | 47¹³⁄₁₆ to 53⁷⁄₁₆ | 50⅝ |
| 10 | 0 | 1 | 0 | 1 | 0 | 0 | 53⁷⁄₁₆ to 59¹⁄₁₆ | 56¼ |
| 11 | 1 | 1 | 0 | 1 | 0 | 0 | 59¹⁄₁₆ to 64¹¹⁄₁₆ | 61⅞ |
| 12 | 0 | 0 | 1 | 1 | 0 | 0 | 64¹¹⁄₁₆ to 70⁵⁄₁₆ | 67½ |
| 13 | 1 | 0 | 1 | 1 | 0 | 0 | 70⁵⁄₁₆ to 75¹⁵⁄₁₆ | 73⅛ |
| 14 | 0 | 1 | 1 | 1 | 0 | 0 | 75¹⁵⁄₁₆ to 81⁹⁄₁₆ | 78¾ |
| * | * | * | * | * | * | * | * | * |
| 62 | 0 | 1 | 1 | 1 | 1 | 1 | 345¹⁵⁄₁₆ to 351⁹⁄₁₆ | 348¾ |
| 63 | 1 | 1 | 1 | 1 | 1 | 1 | 351⁹⁄₁₆ to 357³⁄₁₆ | 354⅜ |

In Table I, "off" is indicated by 0; "on" by 1. Each counter stage is controlled by the previous stage. The counter 38 as an entity can count either forward from 0 to 63, or backward. As any one stage changes from the "on" to the "off" state, the state of the following stage is changed when counting in the forward direction. The direction of the count is determined by the "add-subtract" control 39 on the basis of the phase of the error signal.

Let counter 1 (Table I) be operated at a rate of ten times per second. If at an arbitrary time, zero, all counters were at count 6 (counters 1, 4, 5, and 6 off, counters 2 and 3 on) at $t=0.1$ second, they would change to count 7, at $t=0.2$ second to count 8, etc., when the count proceeds in the forward direction.

The computer 40, FIG. 2, consists of two channels, X and Y, each of which supplies voltages $X_n$ and $Y_n$ to the resolver primary 32, 33. As previously mentioned, the ratio of these voltages bears a definite relationship to the angle of resolver 31. The computer 40 is also subdivided into as many distinct stages as there are stages of counter 38. Each stage computes a definite voltage. The X and Y voltages contributed by the individual stages of counter 38 are summed up to the values $X_n$ and $Y_n$. Each counter stage of counter 38 operates switches in the corresponding computer stage of computer 40 which controls the admission of the incremental stage voltages to the total output $X_n$ and $Y_n$. Thus, referring to Table I, counter stage No. 1 controls computer stage No. 1, etc. Computer stage No. 1 computes $Y_1/X_1=\tan 5\frac{5}{8}$ degrees, yielding a null of the resolver output when the input shaft is $5\frac{5}{8}$ degrees, the center of the angular region represented by count 1. Computer stage No. 2 computes incremental voltages in such a manner that $Y/X$ for count 2 lies in the center of region 2, namely $11\frac{1}{4}$ degrees; computer stage No. 3 characterizes the region of count 4, $22\frac{1}{2}$ degrees. The computer is described in Section II.

The over-all operation of this simplified system as illustrated in FIG. 2 can now be summarized.

Assume that the input shaft 35 is at $67\frac{1}{2}$ degrees; that is, in the range of count 12. As assumed above, the counters 38 are at count 6 at time $t=0$ second, and the computer puts out voltage into the resolver 31 corresponding to the region $30\frac{15}{16}$ to $36\frac{9}{16}$ degrees. As a result, there will be an error voltage of such phase that the add-subtract control 39 will make the binary counter 38 count forward. The same situation holds at $t=0.1$ second, when the count is 7 and $X_n$ and $Y_n$ fit the interval $36\frac{9}{16}$ to $42\frac{3}{16}$ degrees. At $t=0.5$ second, count 11, the error is of such phase as to drive the gate forward. At $t=0.6$ second, count 12, the error is zero. At $t=0.7$ second, count 13, the phase of the error will have reversed, resulting in a backward count. At $t=0.8$ second, count 12, the error is zero again. At $t=0.9$ second, count 13, the phase of the error reverses again. The counter 38 will oscillate back-and-forth between 11 and 13, resulting in an uncertainty at +1 count, or $5\frac{5}{8}$ degrees in this simplified setup. In the actual equipment, counter stage 1 represents an angular increment of five seconds of arc, giving the analog-digital converter of FIG. 2 a maximum uncertainty of ±5 seconds. The binary readout 41 is also driven by the binary counter 38, yielding the angular position of shaft 35 in binary form. The converter of FIG. 2 is a form of servo system, oscillating around the correct angle with an amplitude of 1 count at the frequency at which the counter 38 is pulsed.

Theory of Operation

The over-all block diagram of the analog-digital converter is shown in FIG. 3 and in FIG. 4 which is a simplified version. In order to obtain the very fine angular resolution of five seconds of arc, the converter of FIGS. 3 and 4 is divided into a coarse and a fine system. The coarse system takes up the right-hand half of FIG. 4, and the fine system the left-hand. The coarse system operates only when the error is between $45/128$ and $359\frac{83}{128}$ degrees. This might be the case when an analog-digital converter is switched on. As soon as the coarse system has reduced the error below $45/128$ degrees, the fine system takes control, reducing the error to an uncertainty of ±5 seconds of arc.

The error-measuring means of the coarse system is a 400 c.p.s. resolver 42. The basic components of FIG. 2 can all be found in the over-all block diagram of FIG. 3. The coarse counter has ten stages in place of the six used in Table I. These stages are illustrated in FIG. 3 by the blocks from $2^8$ to $2^{17}$. The angular increment controlled by the first stage of the coarse section of the counter is $45/128$ degrees, as indicated by the block thus marked, above the corresponding counter section $2^8$.

As described in the above patent, the rotary form of the Inductosyn consists of two flat, round glass disks. One disk, the rotor, contains one pattern only, corresponding to the single secondary winding of the 400-cycle resolver 31 or 42, described above. The other disk contains two patterns in space quadrature, as indicated at 32 and 33 of FIG. 2, corresponding to the primary winding of the resolver 31. It is here that the $X_n$ and $Y_n$ voltages from the computer 40 are applied.

Since it is desired to work to an accuracy of five seconds of arc, the circle must be divided into $2^{18}$ or 262,144 parts. The counter consists, therefore, of 18 stages. Stage 1 is designated $2^0$ on FIG. 3, stage 18 being designated as $2^{17}$. Another requirement is that operation should be possible at a top speed of 10 r.p.m. of the input shaft 37. The minimum counter rate can now be calculated. It is the reciprocal of the time it takes a 10 r.p.m. shaft to rotate through five seconds of arc. The minimum counter rate is thus calculated as 43,000 per second. A counter rate of 50-kc. per second has been chosen. Since the operating frequency of the Inductosyn should be at least a few times larger than the counter rate, a carrier frequency of 200-kc. was selected. A higher frequency would have substantially increased the difficulty involved in the design of very accurate computer amplifiers. The 50-kc. pulses are derived from a 200-kc. oscillator 44 in FIGS. 3 and 4 by frequency division.

In FIG. 4 the input shaft 37 is directly coupled to both the Inductosyn 43 and the resolver 42. It must be assumed, therefore, that both error-measuring elements 42 and 43 are at all times in their correct position, or at least within an error of less than five seconds of arc. More likely than not, the counter 45, and thereby the digital output 46, will indicate a wrong position when the equipment is first switched on. The Inductosyn being electrically equivalent to a 64-speed device will null at a wrong position. Therefore, it is necessary that the coarse 1-speed resolver system indicated at the right-hand half of FIG. 4 and the corresponding part of FIG. 3, take control until the coarse error is smaller than an amount which lies well within one cycle of the fine system at the left-hand half of FIGS. 3 and 4. The coarse computer 46 supplies the primary resolver windings like 32 and 33, FIG. 2, with 400-cycle voltages $X_n$ and $Y_n$ which correspond to the instantaneous counter position of counter 45. Since the angle defined by $X_n$ and $Y_n$ does not agree with the resolver shaft angle of the shaft 37, which is the analog input, the secondary winding like 34, FIG. 2, of the resolver 42 will yield a 400-cycle error voltage. The latter is amplified and limited in the 400-cycle error amplifier 47. As described later the voltage limiters in amplifier 47 are so adjusted that the smallest resolver error of $45/128$ degree gives a saturated output voltage in the form of a square wave.

If the discrepancy between the analog input and the counter 45 is larger than $45/128$ degree, the override control circuit 48 in FIGS. 3 and 4 is actuated. In this case, the add-subtract control 49 will make its decisions only on the basis of the 400-cycle error; that is, the counter 45 will count forward or backward, depending on the phase of the 400-cycle error only, and will ignore the phase of the 200-kc. error.

It was previously stated that the counter 45 is advanced at a rate which is dictated by the pulses applied for stage 1, occurring at 50-kc. This rate is high enough, even in the presence of a large error, when the input shaft 37 is stationary. However, when the input shaft 37 rotates at 10 r.p.m. the counter 45 may take a long time to catch up with the input shaft 37. For this reason, the override control 48 also controls a gate 50 for 400-cycle pulses which are submitted to the ninth counter stage $2^8$ in addition to the pulses from the eighth stage $2^7$, which occur at a rate of approximately 200 per second. The number of pulses reaching the ninth stage from the 50-kc. pulse source is 50,000 kc./s. divided by 256. The number of pulses reaching this stage when the coarse gate is opened is 50,000 kc./s. divided by 256 from the fine system plus 400 cycles per second from the coarse system, approximately 600, resulting in approximately a three fold speed up.

Referring to FIG. 3, as soon as the coarse error is reduced to less than $45/128$ degree, the override control 48 is de-activated. The 400-cycle pulses are no longer admitted to the ninth counter stage and the add-subtract control 49 will operate on the basis of the phase of the 200-kc. error signal. The counter 45 advances until the error is within ±5 seconds of arc. The 50-kc. repetition rate is high enough so that the counter 45 can follow the input shaft 37 up to a speed of 10 r.p.m.

The 200-kc. error amplifier 51 has enough gain so that a five-second error signal can be limited to a square wave. The signal resulting from any larger error will be limited to the same square wave. The important information contained in the square wave is its phase.

Should the error become larger than $^{45}/_{128}$ degree, the coarse system would automaticaly take control until the error is reduced to below the threshold of the coarse system. At that time the equipment is returned to fine control.

The instantaneous position of shaft 37, available in the 18-counter stages of counter 45, in binary form, can be read out by means of a shift register 52. The information is available in sequential form, one digit read out after another. The digit 1 is represented by a pulse, the digit 0 by the absence of a pulse. The rate at which the digits are read out is 10-kc. Up to 128 position readings may be taken each second.

The binary information can be transferred from the 18 counter stages of counter 45 to the 18 stages of the magnetic shift register 52 only after a count has been completely set up. Referring to FIG. 3, the readout synchronizer 53 controls the readout gates 54, which are interposed between the counter 45 and the magnetic shift register 52; thus, when a readout command is given, the readout synchronizer 53 permits the readout gates 54 to conduct for about four microseconds, starting 15 microseconds after the initiation of the last count. This time delay is ample, since the longest time for the establishment of any one count is only six microseconds.

The readout synchronizer 53 also immobilizes the operation of the shift register 52 during the time that information is being placed into its storage. It does this by controlling the clock pulse gate 55 which prevents the admission of clock pulses from the 10-kc. clock generator to the shift register 52 during that time.

The sequence of the readout operation is as follows: The counter 45 is reset to within one count of the correct value every 20 microseconds. The clock pulses from generator 56 are admitted to the magnetic shift register 52 which is normally cleared; that is, it stores only the digit 0 in its eighteen stages. When a readout pulse is admitted, the readout synchronizer 53 will permit the simultaneous transfer of the digital counter information to the storage elements of the magnetic shift register 52. This transfer occurs 15 microseconds after the start of the last 50-kc. counter pulse and takes about four microseconds. Clock pulses are not admitted to the shift register 52 in the time interval starting with a read pulse and ending with the clock pulse that follows the read pulse. After that, the readout gates 54 block any further transfer from the counter 45 which proceeds with the following counts. Thereafter, the magnetic shift register 52, again receiving the clock pulses, transfers one digit after another to the output 41 every 100 microseconds, until all eighteen digits are read out. All stages of the shift register 52 are then cleared so that subsequent clock pulses have no further effect. The whole cycle is then repeated when the next read out command is given.

The equipment consists of three main parts: A power supply rack, a rack containing all the electronic panels needed for the converter, and a test fixture on which the Inductosyn disks and a resolver are mounted. These racks and the panel may be of any suitable form and are not illustrated. The computer rack is subdivided into various panels. The details of operation of the equipment can better be understood from a study of the various electronic circuits of which it is composed. In the following, the operation of each panel will be described.

200-kc. Oscillator Panel

The circuit details of this panel are shown in FIG. 5.

The circuit of tubes 57 and 58 is a conventional Wein-bridge oscillator tuned to 200-kc. The 200-kc. sine voltage developed at the plate of tube 58 is further amplified in tube 59. Tubes 60, 61, 62 and 303 are all operated in parallel as one cathode follower. The signal at connector 63 is a 200-kc. sine wave of approximately 3 volts amplitude. The output of cathode follower 64 is applied to tube 65 through a phase lead network 66. Tubes 65 and 67 form two overloaded amplifier stages. The voltage at the plate of tube 67 is a square wave. The latter is differentiated in the coupling network 68 between tubes 67 and 69. In tubes 69 and 70 these pulses are amplified. The diode 71 in the coupling network 72 between tubes 69 and 70 suppresses the negative pulses applied to the grid of tube 70. Therefore, at the plate of tube 70, there appear only negative pulses having a repetition rate of 200-kc. and a peak voltage in excess of 20 volts. Their duration is less than one microsecond.

Tubes 73 and 74 are in a scale-of-two circuit 75. It is triggered by the 200-kc. pulses. At the plate of 74, a 100-kc. square wave appears which is transmitted via wire 76 to the control panel. This square wave is also differentiated and then amplified in triode 77. The resulting negative 100-kc. pulses trigger another scale of two, circuit 78, which includes tubes 79 and 80. The 50-kc. square wave appearing at the plate of 80 is transmitted via cathode follower 81 to the readout panel via terminals 82 and 83. In the coupling network to tube 84, this 50-kc. square wave is differentiated. Since a negative bias is applied to grid 85 of tube 84, only the positive pulses of the differentiated square wave can be amplified. The resultant negative 50-kc. pulses appearing at plate of 84 are transmitted by wire 86 to the first counter stage in the counter panel.

Circuits 87 in FIG. 6 and 88 in FIG. 9b are each bistable flip-flops and will be described later in connection with an example of circuit operation.

400 c.p.s. Oscillator Panel

Tube 94 is a conventional Wein-bridge oscillator tuned to 400 c.p.s. (see FIG. 7). The impedance of this oscillator is reduced to a low value by means of cathode follower 95. The 400 c.p.s. sine wave output is taken off at terminal 96. The voltage is approximately five volts. It is used in the 400 c.p.s. coarse computer 46, see FIG. 4. This voltage is amplified in a regenerative squaring amplifier 97. The square wave output is differentiated. The negative pulses are suppressed by the diode 98. The positive pulses are applied to grid 99 of the dual control pentode 100 and through conductor 101 to the control panel as a reference for determining the add-subtract command for coarse operation. Tube 100 is also used as a gate. A gating voltage (conductor 102) from the override control 48 (FIG. 4) can cut the tube off. This occurs when the system is switched from coarse to fine control. The output consists of negative pulses of about 70 volts peak and of about 7 microseconds duration. These pulses are applied to the counter 45 for coarse control.

Error Panel

The error panel, FIGS. 8a to 8d, contains both the 200-kc. amplifier 51 and the 400 c.p.s. error amplifier 47, see FIG. 4, also FIGS. 8a and 8b. As shown in FIG. 8a, the output 103 of the Inductosyn 43 is stepped up in a special transformer 104 with an impedance ratio of about 1 to 60,000 ohms. It is then amplified in tubes 105, 106, 107 and 108. Plate and grid-limiting takes place so that the signal at the plate of tube 108 is a square wave. Tube 109 is a phase splitter. The out-of-phase square waves are applied to grids 110 and 111 of the switch tubes 112 and 113 respectively. The plates of the tubes 112 and 113 are tied together. The other control grids of tubes 112 and 113 have terminals 114 for connection to counter stage No. 12, indicated at block $2^{11}$ in FIG. 3. Depending on which tube, 112 or 113 conducts, the resulting square wave will be in phase or 180 degrees out of phase with the 200-kc. oscillator 44.

The same principles apply to the 400-cycle error amplifier 47 shown in FIGS. 3 and 8b. Referring to FIG. 8b, the output 239 of resolver 42 in FIG. 4 is fed into the amplifier shown in FIG. 8b. The circuits shown in FIGS. 8c and 8d develop D.C. bias voltages that are applied to the appropriate diodes 235 to 238 for purposes of squaring the 400 c.p.s. error signal symmetrically.

In both channels, the gain is sufficient to obtain a square wave when the error is only one count, i.e., ±5 seconds of arc for the 200-kc. channel, and $^{45}\!/_{512}$ degrees for the 400 c.p.s. channel.

Control Panel

The control panel, FIGS. 9a and 9b contains both the override control 48 and the add-subtract control 49 of FIG. 4. Jack 83 at the lower left portion of FIG. 9a, is connected by cable to the jack of the same number, 83, at the lower right portion of FIG. 5.

The override control is shown in the upper part of the drawings FIGS. 9a and 9b. Tube 115 is a phase splitter. It is followed by a full-wave shunt rectifier 116 which is biased to a desired D.-C. potential by the potentiometer 117. The grid of tube 118 is then at a D.-C. voltage which depends on the 400 c.p.s. error. This voltage is smoothed by the condenser 119. Tubes 118 and 121 are part of a Schmitt trigger circuit 120. If the 400-cycle error is very small, and therefore sinusoidal in character, tube 121 conducts and tube 118 is cut off. If the 400 c.p.s. error is large, corresponding to a system error of $^{45}\!/_{128}$ degrees or larger, the grid voltage of tube 118 is large enough to trigger the circuit 120, so that tube 118 conducts and tube 121 is cut off. The 400-cycle error input is a square wave of constant peak-to-peak value for large errors, so that the control voltage at the grid of tube 118 is both smooth and of fixed value for large errors. As the 400 c.p.s. error decreases below the critical value, the Schmitt circuit 120 is again triggered. Tube 122 is arranged as two cathode followers and avoids loading effects on tubes 118 and 121. The cathodes of tubes 122 are either at ±5 or −22 volts.

The conductor 102, see FIGS. 7 and 9b, from the cathode of tube 124, FIG. 9b, is the control voltage for the gate provided by tube 100 in FIG. 7, in the 400-cycle oscillator panel, mentioned above. When the 400-cycle error is smaller than the critical value, the voltage on conductor 102 is −22 volts and the gate, tube 100, is cut off.

The add-subtract control 49 in FIG. 4 is shown in the lower half of FIGS. 9a and 9b. The output or add-subtract command for the counter 45 of FIG. 4 is represented by the D.-C. cathode voltages of cathode followers 125 and 126 in FIG. 9b.

When the sysem error is large, the 400 c.p.s. error voltage directs the operation of the add-subtract control 49. Tubes 127 and 128, FIG. 9a, form an electronic single-pole-double-throw switch. During coarse operation, tube 127 is biased to cut off and tube 128 can conduct by action of the override control circuit 48 discussed above. The 400 c.p.s. error voltage, applied by conductor 130, see FIGS. 8b and 9a to the control grid 129 of tube 128, is amplified and finally applied to the second control grid 131 of tube 132. This grid 131 is biased to cut off. Only the positive peak of the error voltage will enable the tube 132 to conduct while the negative peak will cut it off. The voltage applied to the other control grid 133 of the tube 132 is derived from the 400 c.p.s. reference voltage on conductor 101, FIGS. 4, 7 and 9a, as follows:

A positive reference pulse arriving from the 400 c.p.s. oscillator panel on wire 101 is applied to one control grid 134 of tube 135. This tube 135 is also controlled by the override control 48 and is in a conducting state during coarse operation. The negative reference pulse is applied to dual control tube 136 which is also switched on by the override control 48. The positive pulse from the plate of tube 136 is then applied to the first control grid 133 of tube 132, and the corresponding grid of tube 139.

If the 400 c.p.s. error voltage is positive at the instant the positive reference pulse arrives at grid 133, a negative pulse will be applied to the flip-flop circuit 88, see FIG. 9b and circuit 87 in FIG. 6. If tube 137 of flip-flop circuit 88 is conducting, the pulse will have no effect; if tube 138 of circuit 88 is conducting, the pulse will change the state of the flip-flop circuit 88 and, thereby, the add-subtract command.

If the 400 c.p.s. error voltage on conductor 130 is negative at the instant the positive reference pulse arrives at grid 133 of tube 132, the flip-flop circuit 88 will not be affected. Tube 139 is cut off during coarse operation.

The principal object of the equipment is to operate with errors of the order of five seconds of arc. This means that the add-subtract control must switch back-and-forth continuously to keep the error within ±5 seconds.

During the 20 microsecond time interval between successive counts (50-kc. repetition rate), the counter 45 must be advanced, the error signal must be established, and a decision must be made to add or subtract the next count. The timing sequence for the 200-kc. system is shown in FIG. 10.

The *add-subtract* command signals are fed into a circuit that has, under operating conditions, three stable states. A fourth stable state may exist, but only in the absence of command information. This may occur at warmup only. One state of the output represents add, denoted by "on-off"; another state represents subtract, denoted by "off-on." The third state, "off-off," inactivates the counter interstages, thus preventing a count from advancing beyond the first stage of the counter.

An example of circuit operation follows:

Circuit 88, FIG. 9 and circuit 87, FIG. 6 are each bistable flip-flop circuits. Assume tube 138 is conducting and tube 140 is cut off. This would be indicated by "off-on" or "subtract." If the phase of the error signal causes the command pulse to appear at the plate of tube 132, a negative pulse, then tube 138 remains conducting and tube 140 conducts. Thus, the output changes to "off-off." If the next command pulse appears at the plate of tube 132 once again, then tube 138 cuts off and tube 140 remains conducting. This sets the output at "on-off" or "add." Further consecutive pulses at the plate of tube 132 will have no effect on the state of the circuit. When the phase of the error signal changes due to the addition of counts, then the command pulse will appear at the plate of tube 139. This will cause tube 138 to conduct and leave tube 140 nonconducting, thus setting the output at "off-off."

The first counter stage controls the 2° switch amplifier 153, FIG. 12. The analog output of this amplifier is equivalent to either 0 degrees or $^{45}\!/_{512}$ electrical degree within one Inductosyn cycle. The cycle for this particular Inductosyn is $^{1}\!/_{64}$ of one revolution of the input shaft 37. This is equivalent to 5 seconds of arc. In the "off-off" state, only the first stage of the counter and its associated computer stage will change state. This change of five seconds of arc, of the input shaft, may cause the phase of the error signal to reverse. Thus, from the "off-off" state, it is possible to go to either *add* or *subtract* for the following 20 microseconds.

If the next command appears at the plate of tube 139, the output will change to "off-on," or subtract. If, instead, the next command appears at the plate of tube 132, the output will change to "on-off," or add.

The prime purpose of the "off-off" state is to avoid instability at the time when a single count causes many counter stages to change simultaneously. This condition produces a large transient in the computer output and masks the error signal used to determine add-subtract. A one-count delay is sufficient to permit the large transient to die down and allow the phase-sensing circuit, described later, to operate on the true signal error.

Fine Control

The phase reference pulse, timed 15 microseconds after a timing pulse, is derived from the 50- and 100-kc. square waves, as shown in the lower left-hand section of FIG. 9a. The 100-kc. square wave is differentiated. The resulting pulse and the 50-kc. square wave are both applied to a coincidence circuit 141. Only when *both* the pulses and the square wave are negative will a negative pulse be placed on control grid 142 of dual control tube 143. This grid 142 is normally biased to a positive voltage so that the tube 143 draws plate current. The negative pulse from the coincidence circuit 141 then yields a positive pulse at the plate of tube 143 which is applied to the blocking oscillator 144. Tube 136 is cut off in this mode.

The blocking oscillator 144 produces a large pulse of short duration which is applied to the control grid 133 of tube 132. This grid is biased to cut off, see FIG. 9b.

The 200-kc. error, conductor 145, FIGS. 8a and 9a, is applied to grid 146 of tube 127, amplified, and appears finally at the other control grid 131 of tube 132, FIG. 9b. Only if the 200-kc. error is positive at the instant that the reference pulse arrives at grid 133 of tube 132 will a negative pulse appear at the plate of tube 132.

If the 200-kc. wave at the terminal of grid 131 of tube 132 was negative at the instant of the reference pulse, tube 132 will remain cut off and a negative pulse will appear at the plate of tube 139.

The phase relationship of the various square waves and pulses are so chosen that the add-subtract command is in the right direction automatically.

Counter

The binary counter 45 consists of eighteen equal stages arranged in tandem. The circuit of one such counter stage is shown in FIG. 11, terminal 274 leading to the following stage. The output lines 202 at the right side of FIG. 11 connect to the OFF and ON terminals indicated at 260 in FIG. 14. The total time delay contributed by each stage is 0.3 microsecond. The longest possible transfer will take less than six microseconds.

Each stage of the counter 45 is a bistable flip-flop. The state of each stage determines the contribution of its associated switch amplifiers in the computer. The first stage of the counter chain ($2^0$), driven at a 50-kc. pulse repetitive rate, represents the least significant digit in the binary chain, and controls the least significant switch amplifier 153 ($2^0$ in FIG. 12). If a large error exists, the state of the add-subtract lines remains fixed. The output of the first counter is a 25-kc. signal that is the input to the second stage ($2^1$). The output of the second stage is a 12.5-kc. signal that is the input to the third stage ($2^2$), etc. Thus the *frequency of the pulses* to each stage goes down from left to right, but the significance of each counter-computer stage goes up from left to right. For example, the $2^0$ stage controls the switch amplifier 153 that contributes either 0 or $45/512$ electrical degrees in analog form, to the computer. The $2^2$ stage controls the switch amplifier 259 that contributes either 0 or $45/128$ electrical degrees in analog form. The $2^2$ stage is four times more significant than the $2^0$ stage, and four pulses into the $2^0$ counter stage produces one pulse into the $2^2$ counter stage.

Each stage contains a fast-acting scale-of-two circuit 147, including tubes 148 and 149. From the 200-kc. oscillator panel, 50-kc. negative pulses arrive at the input of the first counter statge $2^0$. The voltages on the plates of tubes 148 and 149 of this first counter stage are then 25-kc. square waves, 180 degrees out of phase with each other. The voltage swing is about 25 volts. These square wave voltages are coupled through cathode follower circuit 150, including tubes 151 and 152, to the switch amplifier 153, FIGS. 12 and 12b, of the first stage 154, FIGS. 3 and 12, of the Inductosyn computer 155, FIGS. 3, 4 and 12. The frequency of the square waves in each stage is one-half the repetition rate of the pulses impressed on its input.

The plate voltages of each scaler, like 147, FIG. 11, are differentiated and applied to a switch circuit driving the next scaler. The plate voltages are square waves. These square waves are differentiated prior to being applied to the input of the following stage because the counter is best triggered by narrow pulses. The switch circuit is that associated with the two vacuum tubes 156 and 157 in FIG. 11. The tubes 156 and 157 are employed as a gate that is controlled by bias voltages derived from the add-subtract lines 164 and 165, FIG. 9b. If the driving pulse is derived from tube 149, then the counter array will count forward. If the driving pulse is derived from tube 148 of the previous stage, the counter will operate backward.

This selective interconnection is accomplished automatically by dual control pentodes 156 and 157 which have their plates and cathodes tied together. The plate of tube 149 is coupled by a differentiating RC network 158 to grid 159 of tube 156, and the plate of tube 148 likewise through RC circuit 160 to grid 161 of tube 157. The grids 162 and 163 of tubes 156 and 157 respectively are connected to the output voltages of the add-subtract control 49, FIGS. 9a and 9b, by conductors 164 and 165 respectively, FIGS. 11 and 9b, which are +1 volt and −11 volts with respect to the cathode; that is, one pentode 156 or 157 may conduct as far as grids 162 or 163 are concerned, while the other is cut off. In order to count forward, the 162 grid bias on 156 is +1 volt. The grids 159 and 161 are normally at −7.5 volts with respect to the cathodes so that neither tube conducts.

When tube 149 is cut off, there will be a positive pulse on grid 159 of tube 156, large enough to make this tube produce a negative pulse at its plate which is then applied to the next counter stage. Half a cycle later there will be a positive pulse on grid 159 of tube 156. However, this tube is cut off by the negative bias on its grid 162 so that the plate voltage will remain unchanged.

When the add-subtract control 49 interchanges the bias voltages on the grids 162 and 163, the coupling pulse to the next counter stage will be derived from the plate of tube 148 and the counter will operate backward.

Referring to FIG. 11, connections from the terminals 202 marked "to switch amplifiers and to readout circuitry" are shown in the block diagram, FIG. 3. From each of the blocks marked $2^0$ through $2^{17}$, note the connection to an associated block in the row of readout gates indicated at 54. This is shown again in FIG. 21a at the notation "from each scaler."

The connections to the switch amplifiers, as indicated in FIG. 11, are shown in FIG. 3 by a line joining each block of the counter 45 with an associated block of the computer 155 immediately above. The detail of this interconnection consists of wiring the scaler terminals marked "to switch amplifiers" in FIG. 11 to the control grids of the associated switch amplifiers. These grids are shown as pins marked "ON," "OFF" indicated at 260 in FIG. 14 and also indicated at 260 in FIG. 18.

Terminal 123 on FIG. 7 is connected to the input 30 of the ninth scaler stage of the eighteen-stage counter 45, through the gate 50, see FIG. 3.

Terminal 86 on FIG. 5 is connected to the input of the first scaler stage of the eighteen-stage counter 45 in FIG. 3. It is shown in FIG. 3 connecting the control gate 89 to the $2^0$ counter stage.

Referring to FIG. 3, conductor 179 and conductor 291 leading out from the $2^{11}$ stage of counter 45 are connected to the cathode follower outputs of this stage. The above conductors are also marked 114 in FIG. 8a. The cathode follower terminals of the counter stage are marked "to switch amplifiers and to readout circuitry" and are indicated at 202 in FIG. 11.

When the $2^{11}$ counter stage is in the OFF state, the voltage applied to upper terminal 114 of FIG. 8a is positive and the voltage applied to the lower terminal 114 is negative. These voltages are obtained from the cathode follower outputs of the $2^{11}$ counter stage, pin 292 of tube 151, and pin 293 of tube 152, see FIG. 11. The positive voltage on upper terminal 114 of FIG. 8a is applied directly to the control grid 294 of tube 113, permitting this tube to amplify the 200 kc. error signal applied to its signal grid 111. The negative voltage on lower terminal 114 of FIG. 8a is applied directly to the control grid 295 of tube 112. This cuts off tube 112 and prevents amplification of the signal applied to the grid 110 of tube 112. It should be noted that the phase of the signal applied to grid 110 of tube 112 is 180 degrees out of phase with that applied to grid 111 of tube 113. This relationship is derived from the phase splitter tube 109, pins 296, 297 and 298.

When the $2^{11}$ counter stage is in the ON state, the voltage on upper terminal 114 is negative and the voltage on lower terminal 114 is positive. This cuts off tube 113 and permits 112 to amplify the 200 kc. error signal applied to its signal grid 110.

Thus, for an OFF condition of the $2^{11}$ counter stage, the output of the error amplifier 51, terminal 145, FIG. 8a, is in phase with respect to the 200 kc. reference indicated at 44 in FIG. 3; and for an ON condition of the $2^{11}$ counter stage, the output of the error amplifier 51 is 180° out of phase with respect to the 200 kc. reference indicated at 44 in FIG. 3. The $2^{11}$ stage, therefore, adds 0° or 180° to the fine computation.

The function of the $2^{17}$ stage in the coarse system is similar to that of the $2^{11}$ stage in the fine system.

*Computer*

The computer consists of two parts—a coarse section 46 and a fine section 155, FIG. 4, see also FIG. 3. These two sections 46 and 155 overlap partially. A schematic diagram of the fine computer 155, called "Inductosyn Computer," is shown in FIG. 12. FIG. 13 is a schematic drawing of the resolver or coarse computer 46.

Output 174 of FIG. 14 is connected through resistors to the inputs of other amplifiers of the type shown in FIG. 14, FIG. 15 and FIG. 16. The amplifiers of the type shown in FIG. 14 are desginated by an "X" in FIG. 12. Their respective outputs are connected as shown in the Inductosyn computer 155 of FIG. 12.

The Inductosyn computer 155 consists of 12 stages $2^0$ to $2^{11}$. Eleven stages $2^0$ to $2^{10}$, compute the X and Y voltages applied to the Inductosyn primary windings not shown through transformers 166 and 167. The twelfth stage $2^{11}$, operates on the error signal obtained from the Inductosyn secondary winding not shown, through transformer 168 and amplifier 243, as explained above. The feedback amplifier 242, FIG. 17, is similar to the 200 kc. feedback amplifier shown in FIG. 16, except for the output circuit. The final stage of each of the two amplifiers 242 in FIG. 12 is designed to drive the output transformers 166 and 167 associated respectively with the stator windings of the Inductosyn 43. In FIG. 12, Inductosyn 43 has an output transformer 168, the output of which has a switch amplifier 243. The notation "180° Phase Reversal" applies to the switch amplifier 243 which leads to "To Phase Detector." This amplifier 243 is controlled by the $2^{11}$ counter stage indicated at 273 in FIG. 12 and is the final stage in the Inductosyn Computer 155. Amplifier 243 reverses the phase of the error signal only when the $2^{11}$ counter is activated.

Inductosyn 43, like resolver 42 of FIG. 4, the latter being shown schematically at 31 in FIG. 2, has a single winding rotor mounted on the input shaft 37 and two stator windings in space quadrature, fastened to the reference frame.

As shown in FIG. 12, the first eleven stages are divided into two channels, X and Y, which are interconnected. Each computer stage is controlled by a stage of the binary counter 45 and is capable of changing the X and Y voltages by an amount which corresponds to a definite angular increment. The angular increments increase as powers of two, just as the value of a digit in a binary number depends on the position of the digit.

It should be noted that binary numbers appearing in this discussion are written with the lowest value digit at the left, the highest value digit at the right. Thus, number 16 is written as 00001 and not 10000.

The first stage 154 of the computer computes voltages having a ratio which adds $45/512$ electrical Inductosyn degrees to the value zero. This corresponds to $45/512 \times 1/64$ degrees of the input shaft 37 which is very close to five seconds of arc. The second stage 169 handles an increment of $45/256$ electrical Inductosyn degrees, or twice as much as the first stage. The third stage 170 handles twice as much as the second stage, and so forth, until the incremental value of the eleventh stage 171 is 90 electrical Inductosyn degrees.

In computing the voltages X and Y, it is only important that the ratio of the voltages $X/Y$ be correct, for the ratio defines the tangent of the angle. The absolute value of the X and Y may be chosen to suit the convenience of the design.

If we call the X and Y coordinates of the lower order angle $X_{n-1}$ and $Y_{n-1}$ and the angular increment of the highest order stage $\delta_n$ (where $n$ refers to the order of the stage involved and not to the count), then the coordinates $X_n$ and $Y_n$ of the desired angle are computed as follows, see FIG. 13a.

$$\tan(\theta_{n-1} + \delta_n) = \frac{\tan\theta_{n-1} + \tan\delta_n}{1 - \tan\theta_{n-1}\tan\delta_n} = \frac{Y_n}{X_n} \quad (1)$$

since $$\tan\theta_{n-1} = \frac{Y_{n-1}}{X_{n-1}} \quad (2)$$

$$\frac{Y_n}{X_n} = \frac{\frac{Y_{n-1}}{X_{n-1}} + \tan\delta_n}{1 - \frac{Y_{n-1}}{X_{n-1}}\tan\delta_n} = \left(\frac{Y_{n-1} + X_{n-1}\tan\delta_n}{X_{n-1} - Y_{n-1}\tan\delta_n}\right)\left(\frac{X_{n-1}}{X_{n-1}}\right) \quad (3)$$

from this $$X_n = (X_{n-1} - Y_{n-1}\tan\delta_n)(X_{n-1}) \quad (4)$$

$$Y_n = (Y_{n-1} + X_{n-1}\tan\delta_n)(X_{n-1}) \quad (5)$$

The factor $X_{n-1}$ in each equation is only a scale factor and therefore omitted in the computation.

The applicable equation for the X and Y channel of the computer are then $$X_n = X_{n-1} - Y_{n-1}\tan\delta_n \quad (6)$$

$$Y_n = Y_{n-1} + X_{n-1}\tan\delta_n \quad (7)$$

These equations apply no matter whether one stage or eleven stages are involved, $n$ always standing for the order of the highest stage.

The voltages are added by feedback amplifiers having a high value of feedback in order to maintain high accuracy. These feedback amplifiers which serve as sign changers only are designated in the circuit as shown in FIG. 12a, and those that switch their inputs according to the command from the counters are designated as shown in FIG. 12b. For circuit details refer to FIGS. 14, 15, 16 and 17, and corresponding description.

The amplifier 240 of FIG. 15 is the summing amplifier also shown at 240 at the left of the bottom row of FIG. 12. It serves to sum the contribution of the $2^0$ through $2^5$ switch amplifiers in the Inductosyn computer 155.

The output of a counter (arrowed lines 202 at the right side of FIG. 11) is a pair of D.C. voltages. For an "ON" condition, the positive voltage applied to the ON terminal 260 of the associated switch amplifier 153, FIG. 14, permits the tube 177 to act as an amplifier. At the same time the negative voltage applied to the OFF terminal 260 places the tube 178 in a cut-off condition. For an "OFF" condition, the voltages at the "ON" and "OFF" terminals 260 are interchanged, brought about by the symmetric reversal in the counter. In this condition, the tube 178 acts as an amplifier and the tube 177 is cut off.

A switch amplifier 153, FIG. 14, has two input terminals 172 and 173 and one output 174. Either of the two inputs 172 or 173 is selected by the counter which cuts the undesired input stage off. For the switch amplifier in stages 7 to 10, the voltage impressed on input 172 and applied to grids 175 and 176 of tubes 177 and 178, respectively, is supplied by the previous stage. When the computer stage of interest is off, so that it does not increase the channel voltage, tube 178 is cut off and the output of the computer stage equals its single input in magnitude but 180 degrees out of phase. When the stage is on, tube 177 is cut off, and the incremental voltage is applied by input to grid 176 of tube 178. The output of the feedback amplifier then equals the sum of its inputs, 180 degrees out of phase.

The cross-coupled switch amplifiers like 153 in FIG. 14 of stages 1 to 6 in FIG. 12 have inputs 172 (FIG. 14) grounded. For computer stages $2^0$ through $2^5$, inputs 172 (FIG. 14) are grounded and inputs 173 (FIG. 14) are connected to the Y reference signal. Thus, when tube 177 conducts, the amplifier output is zero; when tube 178 conducts, the output equals the input at 173 (FIG. 14). As shown in FIG. 12, these outputs are divided down in binary proportion before being applied to the mixing amplifier.

The expression "cross-coupled" refers to the application of a portion of the Y coordinate signal (top row FIG. 12) through appropriate switch amplifiers 153 ($2^0$ through $2^5$) in FIG. 12 to the X coordinate signal in the bottom row.

Consider the example of computing X and Y voltages for the angle 0 1 1 0 0 0 1 1 and refer to FIG. 12. $X_{n-1}$ and $Y_{n-1}$ exist at point "A" at the output of the $5\frac{5}{8}°$ switch amplifier in the top row, and at point "B" at the output of the $5\frac{5}{8}°$ switch amplifier in the bottom row. That is, $X_{n-1}$ and $Y_{n-1}$ exist after the switch amplifiers of the seventh stage.

According to Equation 7, the incremental voltage must be $X_{n-1} \tan \delta_n$. At point B, voltage $X_{n-1}$ exists. Two calibrated precision resistors 261 and 262 divide voltage $X_{n-1}$ to the value $X_{n-1} \tan \delta = X_{n-1} \tan 11\frac{1}{4}$ degrees for the stage under discussion. At point C then exists the sum $Y_n = Y_{n-1} + Y_{n-1} \tan \delta$. All resistors depicted in FIG. 12 are precision resistors, in order to satisfy the accuracy requirements of the computer.

The voltage $X_n$ is computed similarly. The increment is, however, negative; namely, $-Y_{n-1} \tan \delta$. A sign-changing feed-back amplifier 246, FIG. 12, is therefore interposed between the tan $\delta$ dividing resistors 263 and 264 at point A and input 173 (FIG. 14) of the X-switch amplifier of stage 8 associated with the $2^7$ counter. All following switch amplifiers are "OFF" so that the voltages $X_n$ and $Y_n$ at points C and D appear also at the output of the eleventh stage, that is, at the output of the $11\frac{1}{4}$ degree switch amplifier in the top and bottom rows respectively.

The amplifier 241 of FIG. 16 is the sign-changing feedback amplifier referred to in the preceding paragraph. There are six amplifiers of this type in the Inductosyn (200-kc.) computer, FIG. 12, including the amplifier 244 immediately following $2^{13}/_{16}°$ and the five amplifiers 245 to 249 to the right, that connect the upper row to the lower row and shown between these two rows.

While the example chosen was applicable to the eighth stage, the principle applies to all stages.

If the zero reference angle is chosen $Y=1$ and $X=0$, then advantage can be taken of the fact that Y remains 1 for small angles and only X changes. This simplification is apparent in the first six stages for which $Y_n = Y_0 = 1$, also $X_n = -Y_{n-1} \tan \delta$. A feedback amplifier 240, FIG. 15, shown at 240 in FIG. 12, sums up all the X inputs to the sixth stage of the Inductosyn computer 155 of FIG. 12. The Y-channel has a feedback amplifier like 241 in FIG. 16 shown at 244 in FIG. 12, in the sixth stage to change the sign to correspond to the sign change in the X channel.

Stages 7, 8 and 9 are described in the example. In stage 10, advantage is taken of the fact that $\delta_n = 45$ degrees. Since $\tan 45° = 1$, the voltage dividing resistors at points E and F in FIG. 12 are omitted. Voltage dividing resistors, such as 263 and 264, are employed at the output of each switch amplifier from $2^0$ through $2^7$. This is not required at the output of the $2^8$ switch amplifiers in the X and Y channels at points E and F.

Stage 11 is also simplified. In both Equations 6 and 7 are multiplied by $\cos \delta_n$, one obtains $$X_n = X_{n-1} \cos \delta_n - Y_{n-1} \sin \delta_n \qquad (8)$$
$$Y_n = Y_{n-1} \cos \delta_n + Y_{n-1} \sin \delta_n \qquad (9)$$

for stage 11 $\delta_n = 90$ degrees. Equations 8 and 9 simplify to $$X_n = Y_{n-1} \qquad (10)$$
$$Y_n = X_{n-1} \qquad (11)$$

The effect of the 12th stage with $\delta_n = 180$ degrees would be only a sign change as can be seen by inspection of Equations 8 and 9. By changing the sign of the error instead, two feedback amplifiers were omitted from the computer 155. This sign change is accomplished in the output stage of the error amplifier 51.

Everything that has been said above of the Inductosyn computer 155 applies equally to the resolver computer 46. The applicable drawings are shown in FIGS. 3, 13, 18, 19 and 20. The amplifier of FIG. 19 is the sign-changing feedback amplifier for the resolver (400 c.p.s.) computer. Five of these units are used in the resolver computer, FIG. 13 including the amplifier 251 at the left of the top row, and the four amplifiers 252 to 255 to the right, that connect the top row to the bottom row.

The amplifier 256 of FIG. 20 is the summing amplifier indicated at 256 at the left of the bottom row of FIG. 13. It sums the contribution of the $2^8$ through $2^{12}$ switch amplifiers 257 in the resolver computer of FIG. 13.

Stages 9, 10, 11 and 12 of the Inductosyn computer 155 overlap with stages 1, 2, 3 and 4 of the resolver computer 46. This is indicated in the block diagram of FIG. 4 and is shown in further detail in FIG. 3 where the conductor 179 feeds the error amplifier 51 from the 4th stage, marked $2^{13}/_{16}°$ of the coarse computer 46 and from the 12th stage, marked $2^{11}$, of the Inductosyn computer 155. The override control 48 decides whether the fine or coarse computer is used. By providing the overlap, the decision-making capacity of the override control can be less exacting.

*Shift Register Panel*

The shift register panel, FIGS. 21a, 21b, 21c and 22, contains all the circuitry for the readout synchronizer 53, see FIG. 3, the readout gates 54, the internal 10-kc. clock generator 56, the clock pulse gate 55, and the magnetic shift register 52.

The readout synchronizer 53 is shown in FIG. 22. The readout command pulse, which may be a very short negative pulse or a potential of any polarity having steep sides, is applied to the grid of tube 180, which is an amplifier, tube 181 being a cathode follower. The pulse output of the cathode follower 181 is differentiated in the R-C differentiating network 182. The resulting negative pip is suppressed in the shunt diode 183 and the positive pip is used to trigger the monostable multivibrator 184. The positive output pulse at the plate of tube 185 is adjusted by means of the potentiometer 186 to a width just short of 20 microseconds. This pulse is applied to control grid 187, of the coincidence tube 188. This grid 187 is normally biased to cut-off. The voltage applied to control grid 189 is obtained from the delay multivibrator 190 shown in the lower section of FIG. 22.

The 50-kc. square wave from cathode follower 81 of the 200-kc. oscillator panel, FIG. 5, is differentiated terminal 83 of FIG. 5 being an input to the lower portion of the circuit of FIG. 22. The negative pulses are suppressed by a shunt diode 191, and the positive pulses are used to trigger the delay multivibrator 190. The positive square wave at the plate of tube 192 is adjusted for a width of 15 microseconds. Upon differentiation and suppression of the positive pip, a negative pulse remains. This pulse occurs 15 microseconds after the 50-kc. counter pulse which triggers the first counter stage $2^0$. This pulse is amplified in tube 193. At the cathode 194 of cathode follower 195 there is then a positive pulse about one-half microsecond wide, occurring at the proper time with respect to the counter 45.

This positive pulse is applied to control grid 189, of coincidence tube 188, which is normally biased to cut off. Only when both control grids 187 and 189 are driven positive will pentode 188 conduct. The resulting negative pulse triggers a monostable multivibrator 196 which is adjusted by the potentiometer 197 to yield a five-microsecond-wide positive pulse. By a suitable voltage divider 198, returned to −200 volts, the output of the cathode follower 265 is a five-microsecond positive pulse about 25 volts above the quiescent voltage of −20 volts. Its leading edge occurs 15 microseconds after the last count was initiated. This pulse will be referred to as the "read" pulse.

The read pulse controls the 18 readout gates indicated at 54 in FIG. 3. Each readout gate consists of a coincidence circuit 199, shown in FIG. 23, working together with a thyratron indicated at 200.

The readout pulse is connected to one input 201 of all coincidence circuits like circuit 199. The other input 202 is connected to a cathode of tubes 151 and 152, of FIG. 11, of each counter stage. This voltage is either −20 or +6 volts, depending on the state of the counter stage. The grids of all thyratrons like 200 are normally at −20 volts. Only during the five-microsecond interval when *both* inputs, 201 and 202, go positive will the grid of the thyratron 200 be driven positive. This will trigger the quasi-stable thyratron circuit 199.

The "other input" referred to above, of each coincidence circuit is connected to one particular cathode of tubes 151 and 152, FIG. 11, of each counter stage. In order to read the digit, only one output of FIG. 11 is required. If a counter stage is in an "0" or "OFF" state, then the D.C. voltage at one output of FIG. 11 is higher than the D.C. voltage at the other output. If the counter stage is in a "1" or "ON" state, then the D.C. voltages are interchanged. Either output provides an indication of the state of the counter. Two outputs are provided in order to control the switch amplifiers of the computer.

The magnetic memory indicated in FIG. 21b represents a commercially available type of equipment which handles four stages, the four-stage magnetic memory unit 203 in FIG. 21b constituting one unit and as the present invention includes 18 counter stages, five such units are required. These five shift register units are the same except as follows: (a) terminal 204 is the output of unit No. 5, where the digital number in the form of binary pulses is available corresponding to the angle of input shaft 37; (b) terminal 205, FIG. 21a, in the plate circuit of a beam power amplifier 207 is connected to a terminal 206 on unit 5; and (c) the 10K, 25 w. resistance indicated at 208 in FIG. 21b is 17K on shift register unit No. 5.

The shift register circuit in FIGS. 21a and 21b indicates, for example, the circuits from each scaler for the four stages, $2^{14}$ to $2^{17}$, each including a coincidence circuit 199 in FIG. 23, one of each of the four thyratrons indicated at 200 in FIG. 21b corresponding to the thyratron indicated at 200 in FIG. 23.

FIG. 21b schematically shows the Raytheon Model SR20 unit which is a four-digit magnetic storage device. Five of these units are used to store and shift the 18-digit output of the analog-digital converter. The output of the last stage consists of a train of 18 pulses, appearing at a rate of 10,000 pulses per second, determined by the clock pulse repetition rate.

Information is conveyed by the amplitude of each pulse. Thus a large pulse signifies a "1" and a small pulse signifies a "0" for the particular digit represented.

For example, if the shaft is in a position that renders the counters $2^0$, $2^5$ and $2^{17}$ active, the pulse train would have a large pulse at locations corresponding to these active counters, and a small pulse at locations corresponding to the other counters.

A 0.1-microfarad shunt condenser like 266 across the out of each thyratron indicated at 200 will send a heavy discharge current through the input winding like 221 of the associated stage of the magnetic shift register 52, for such stages being shown in FIG. 21 and indicated at 200. Circuit parameters are so chosen that the pulse duration is of the order of 30 microseconds, after which time only a small screen current passes through the input winding like 221.

The 30 microsecond current pulse is obtained as follows: With the input to a thyratron 200 held at a negative potential, the .1 mfd. capacitor 266 connected to the plate 267 of the thyratron charges up to full B+ potential, through the 47K, 1 w. resistor 268 and the 2.5 millihenry choke 269. When the grid of the thyratron is driven positive, the capacitor 266 is provided with a low impedance discharge through the tube, the input winding like 221 or 228 of the magnetic memory element connected to the cathode, and the 2.5 millihenry choke 269. The sudden discharge of the capacitor 266 through this low impedance path is the 30 microsecond current pulse referred to above.

The purpose of the 2.5 millihenry coil 269 is to cause the thyratron to cut-off after the capacitor 266 has discharged as described above.

The .1 mfd. capacitor 270, common to the four thyratrons indicated at 200 in FIG. 21b, is part of a filter network for the B+ supply common to the plate circuits of the four thyratrons 200.

The heavy 30-microsecond current pulse places the magnetic stage into state 1. As for the counter 45, the transfer of state 1 to the magnetic storage 203 consists of a trigger pulse and is over in less than five microseconds. The magnetic memory needs a much longer pulse, which is supplied by the thyratron circuit 199, FIGS. 21a, 21b and 23.

Th asymmetrical multivibrator 213 generates the 10-kc. positive clock pulses which are on for ten microseconds and off for ninety microseconds. Cathode follower 223 prevents loading of the multivibrator 213. A selector switch 215 permits the use of external clock pulses. In any case, it should be noted that the clock pulses are not synchronized with the 50-kc. counter pulses.

The clock pulses are continuously admitted to the shift windings, 217 to 220, of the register. Any clock pulse must be barred from the register 52, however, during the interval when data is being transferred into the input winding like 221, from the thyratrons 200. The clock pulses are transmitted to the shift-winding 217 to 220 via cathode follower 216 and beam power amplifier 207. All shift windings 217 to 220, are connected in series and form the plate load of power amplifier 207, which can supply a current pulse of the order of one ampere.

The clock pulses applied to the grid of tube 216 can be shunted to ground by triode 214 if the latter is made conducting. Tube 214 is normally cut off, thus presenting a high shunt resistance. Its grid is connected to flip-flop circuit 224.

The read pulse is differentiated and the positive pip occurring at the *beginning* of the read pulse is applied to the grid of tube 225. This action makes tube 225 conduct and cuts off tube 226. The plate of tube 226 goes positive and transmits this change of voltage to the grid of the shunt triode 214 which will then prevent any clock pulse from reaching the normally cut-off beam power tube 207. Simultaneously, the clock pulses are also differentiated. The negative pip, occurring at the *end* of each clock pulse, is applied to the plate of tube 226. The clock pulse signal appears at the cathode of tube 223, point "A." From this point, the connection can be traced through the capacitor 271 and the diode 272 to the plate of tube 226. This negative pip will reverse the state of the flip-flop circuit 224 and make tube 226 conduct again. The drop in voltage will cut tube 214 off again.

The following clock pulses will now transfer the stored information out of shift register 52 in serial form. This occurs as follows: If any core, like 227, was in state 1, a shift pulse will place the core in state 0, and the induced voltage in the transfer winding like 301 will cause a current in the input winding like 228 of the following stage. The polarities involved are such that the following core like 229 will remain in state 1 if it was in state 1, or it will be put into state 1 if it was in state 0. Thus, state 1 is transferred from one core to the next.

If the first core like 227 had been in state 0, the shift pulse would have had no effect on it, and there would have been no voltage induced in the transfer winding 301. If the following core like 229 was in state 1, it would be cleared by the shift pulse that did not affect the first stage; thus, this stage is in state 0. If it is in state 0, neither the transfer winding nor the shift winding will affect it. It is as though state 0 had been transferred from one core to the next.

Since each clock pulse transfers the state of a core to the following core, a series of 18 clock pulses will cause the 18 digits to appear sequentially, in pulse form, at the transfer winding like 302, of the last stage. Thus, the magnetic shift register 52 is cleared and ready for the next readout cycle.

It will be understood that the readout may be from the magnetic memory either in parallel with a wire appropriate to each counter channel, or in series as described above. The disadvantage of the parallel arrangement is that a recording head would be required for each channel. In the series arrangement, a time element is introduced in order to spread out or separate the pulses pertinent to the different channels for purposes of viewing or recording, this time element being introduced in a scope, if the pulses are to be examined, or by a running magnetic tape if the pulses are to be recorded. The advantage of the series arrangement described above, of course, is that only one recording head is required for all channels, which are 18 in number in the example given here.

The "Scope" selector switch 209 in FIG. 21c has a scope input and terminals 210 for connection to terminals 211 to check the wave form in the various portions of the circuit, for purposes of test and service, by operating the switch 209 to various positions "A" to "F" and "I" to connect the scope to the correspondingly marked portions of the circuit in FIG. 21a.

*Power Supply*

The power supply rack for the analog-digital computer is shown schematically in FIG. 24. This rack contains seven D.-C. supplies and a control panel. Total power delivered to the computer rack is 310 watts of "B" power and 450 watts of filament power. Filament transformers are located in the computer rack to minimize voltage drop in the cable.

The control panel contains switches and indicators for the filament supply, "B" supplies, and blowers. The power control circuitry provides a means for minimizing shock excitation of tube filaments at warmup. When the main power switch is operated, time delay relay 230 permits the application of half-voltage to the filament transformers for one minute. The dropping resistor 231 is then shorted and full filament voltage is applied. Time delay relay 232 permits the application of "B" voltages to the system two minutes after the main switch 233 is turned on. The B+ control switch 234, in series with the contacts of relay 232, is effective only after the required time delay. The main purpose of this procedure is to increase tube life, thereby increasing equipment reliability.

Various other modifications may be made in the invention without departing from the spirit of the following claims.

We claim:

1. An analog-to-digital converter system comprising a closed-loop servo system including a counter supplying digital information signals, a computer having an input of said signals from said counter, said computer constituting a digital-to-analog converter supplying analog information signals in the form of sine and cosine voltages corresponding to the electrical angle represented by the digital count, a device having an input of said analog information signals, said device having a relatively rotatable winding and relatively stationary windings in space phase receiving said analog information signals, said device having an independent analog shaft position input for said relatively rotatable winding, said device having an analog error signal depending on the relation between the position of said shaft and said relatively rotatable winding and the analog signal input to its said space phase windings, an add-subtract control having an input of said analog error signal, and means comprising said add-subtract control for driving said counter in the proper direction to reduce said analog error signal substantially to zero when the digital count corresponds to the shaft position of the said relatively rotatable winding.

2. An analog-to-digital converter system according to claim 1, wherein said counter is a binary counter, said counter haivng a binary read-out device.

3. An analog-to-digital converter system according to claim 1, wherein said device which has relatively rotatable and stationary windings comprises a multi-pole resolver.

4. An analog- to digital converter system according to claim 1, wherein said computer has a fine section and a coarse section, said device which has relatively rotatable and stationary windings comprising corresponding fine and coarse members, said servo loop including a coarse-fine switch controlled by coarse and fine errors supplied to said add-subtract control from said coarse and fine members respectively.

5. An analog-to-digital converter system according to claim 1, wherein said add-subtract control comprises means for interchanging the biases on grids of electron tubes to control the direction in which said counter counts.

6. An analog-to-digital converter system according to claim 1, wherein said add-subtract control comprises means responsive to reversal of phase in the output from said relatively rotatable winding for causing a backward count of said counter.

7. An analog-to-digital converter system comprising a closed-loop servo system including a counter supplying digital information signals, a computer having an input of said signals from said counter, said computer constituting a digital-to-analog converter supplying analog information signals in the form of co-function voltages corresponding to the electrical angle represented by the digital count, a device having an input of said analog information signals, said device having a relatively rotatable winding and relatively stationary geometrically spaced windings receiving said analog information signals in corresponding trigonometric relation, said device having an independent analog shaft position input for said relatively rotatable winding, said device having an analog error signal depending on the relation between the position of said shaft and said relatively rotatable winding and the analog signal input to its said stationary windings, an add-subtract control having an input of said analog error signal, and means comprising said add-subtract control for driving said counter in the proper direction to reduce said analog error signal substantially to zero when the digital count corresponds to the shaft position of said relatively rotatable winding.

References Cited in the file of this patent
UNITED STATES PATENTS

| | | |
|---|---|---|
| 2,614,237 | Goertz | Oct. 14, 1952 |
| 2,741,941 | Madsen et al. | Apr. 17, 1956 |
| 2,836,356 | Forrest | May 27, 1958 |
| 2,850,240 | Dickinson | Sept. 2, 1958 |